(12) United States Patent
Paone et al.

(10) Patent No.: US 11,901,591 B2
(45) Date of Patent: Feb. 13, 2024

(54) FUEL CELL FLOW FIELD DESIGN FOR THERMAL MANAGEMENT

(71) Applicant: LOOP ENERGY INC., Burnaby (CA)

(72) Inventors: Matthew Paul Paone, Burnaby (CA); Sean Michael Mackinnon, Vancouver (CA); Raoul Jacob Kingma, Langley (CA); Sheilah Melissa Galati, Vancouver (CA); Greg John Montie, Squamish (CA)

(73) Assignee: Loop Energy Inc., Burnaby (CA)

( * ) Notice: Subject to any disclaimer, the term of this patent is extended or adjusted under 35 U.S.C. 154(b) by 203 days.

(21) Appl. No.: 17/151,652

(22) Filed: Jan. 18, 2021

(65) Prior Publication Data

US 2021/0202962 A1    Jul. 1, 2021

Related U.S. Application Data

(63) Continuation of application No. 16/138,149, filed on Sep. 21, 2018, now Pat. No. 10,930,942, which is a
(Continued)

(51) Int. Cl.
  *H01M 8/0265*    (2016.01)
  *H01M 8/0267*    (2016.01)
  (Continued)

(52) U.S. Cl.
  CPC ....... *H01M 8/0265* (2013.01); *H01M 8/0258* (2013.01); *H01M 8/0263* (2013.01);
  (Continued)

(58) Field of Classification Search
  CPC ............. H01M 8/0265; H01M 8/0258; H01M 8/0263; H01M 8/0267; H01M 8/04074;
  (Continued)

(56) References Cited

U.S. PATENT DOCUMENTS

| 4,324,844 A | 4/1982 | Kothmann |
| 4,407,904 A | 10/1983 | Uozumi et al. |

(Continued)

FOREIGN PATENT DOCUMENTS

| AT | 407589 B | 4/2001 |
| CA | 2437891 A1 | 8/2002 |

(Continued)

OTHER PUBLICATIONS

Examination Report issued in connection with Japanese App. No. 2018549209 dated Mar. 5, 2021.
(Continued)

*Primary Examiner* — Karie O'Neill Apicella
(74) *Attorney, Agent, or Firm* — Cook Alex Ltd.

(57) ABSTRACT

Fuel cell assemblies comprising at least one thermally compensated coolant channel are provided. The thermally compensated coolant channel has a cross-sectional area that decreases in the coolant flow direction along at least a portion of the channel length. In some embodiments, such thermally compensated coolant channels can be used to provide substantially uniform heat flux, and substantially isothermal conditions, in fuel cells operating with substantially uniform current density.

20 Claims, 14 Drawing Sheets

Related U.S. Application Data continuation of application No. PCT/CA2017/050358, filed on Mar. 21, 2017.

(60) Provisional application No. 62/311,901, filed on Mar. 22, 2016.

(51) Int. Cl.

| | |
|---|---|
| *H01M 8/0258* | (2016.01) |
| *H01M 8/0263* | (2016.01) |
| *H01M 8/04007* | (2016.01) |
| *H01M 8/04701* | (2016.01) |
| *H01M 8/04746* | (2016.01) |
| *H01M 8/2465* | (2016.01) |
| *H01M 8/10* | (2016.01) |

(52) U.S. Cl.
CPC ..... *H01M 8/0267* (2013.01); *H01M 8/04074* (2013.01); *H01M 8/04723* (2013.01); *H01M 8/04768* (2013.01); *H01M 8/2465* (2013.01); *H01M 2008/1095* (2013.01)

(58) Field of Classification Search
CPC ......... H01M 8/04723; H01M 8/04768; H01M 8/02465
See application file for complete search history.

(56) References Cited

U.S. PATENT DOCUMENTS

| | | | |
|---|---|---|---|
| 4,490,445 A | 12/1984 | Hsu | |
| 4,770,955 A | 9/1988 | Ruhl | |
| 4,910,100 A | 3/1990 | Nakanishi | |
| 4,953,634 A | 9/1990 | Nelson et al. | |
| 5,338,622 A | 8/1994 | Asu et al. | |
| 5,399,442 A | 3/1995 | Shundo | |
| 5,514,486 A | 5/1996 | Wilson | |
| 5,527,634 A | 6/1996 | Meacham | |
| 5,549,983 A | 8/1996 | Yamanis | |
| 5,589,285 A | 12/1996 | Cable | |
| 5,595,834 A | 1/1997 | Wilson et al. | |
| 5,851,689 A | 12/1998 | Chen | |
| 6,048,633 A | 4/2000 | Fujii et al. | |
| 6,057,053 A | 5/2000 | Gibb | |
| 6,117,286 A | 9/2000 | Shimamune et al. | |
| 6,161,610 A | 12/2000 | Azar | |
| 6,190,793 B1 | 2/2001 | Barton et al. | |
| 6,234,245 B1 | 5/2001 | Reid et al. | |
| 6,245,453 B1 | 6/2001 | Iwase et al. | |
| 6,253,835 B1 | 7/2001 | Chu et al. | |
| 6,258,474 B1 | 7/2001 | Diethelm et al. | |
| 6,291,089 B1 | 9/2001 | Piaschik et al. | |
| 6,337,794 B1 | 1/2002 | Agonafer et al. | |
| 6,344,290 B1 | 2/2002 | Bossel et al. | |
| 6,406,809 B1 | 6/2002 | Fujii et al. | |
| 6,423,437 B1 | 7/2002 | Kenyon | |
| 6,528,196 B1 | 3/2003 | Fujii et al. | |
| 6,551,736 B1 | 4/2003 | Gurau et al. | |
| 6,586,128 B1 | 7/2003 | Johnson et al. | |
| 6,663,992 B2 | 12/2003 | Lehnert et al. | |
| 6,664,693 B2 | 12/2003 | Leger et al. | |
| 6,686,082 B2 | 2/2004 | Leger et al. | |
| 6,689,503 B2 | 2/2004 | Yang | |
| 6,699,614 B2 | 3/2004 | Rock | |
| 6,722,422 B1 | 4/2004 | Feldmeier | |
| 6,729,383 B1 | 5/2004 | Cannell et al. | |
| 6,756,149 B2 | 6/2004 | Knights et al. | |
| 6,773,843 B2 | 8/2004 | Kitagawa et al. | |
| 6,797,425 B2 | 9/2004 | Blanchet | |
| 6,849,353 B2 | 2/2005 | Vora et al. | |
| 6,903,931 B2 | 6/2005 | McCordic et al. | |
| 6,921,598 B2 | 7/2005 | Yamamoto | |
| 7,008,712 B2 | 3/2006 | Naruse et al. | |
| 7,067,213 B2 | 6/2006 | Boff et al. | |
| 7,108,929 B2 | 9/2006 | Kutrz et al. | |
| 7,138,200 B1 | 11/2006 | Iwase et al. | |
| 7,316,853 B2 | 1/2008 | Takagi et al. | |
| 7,348,094 B2 | 3/2008 | Thompson et al. | |
| 7,399,547 B2 | 7/2008 | Perry | |
| 7,410,714 B1 | 8/2008 | Burke | |
| 7,459,227 B2 | 12/2008 | Rock et al. | |
| 7,517,602 B2 | 4/2009 | Homma | |
| 7,524,575 B2 | 4/2009 | Bai et al. | |
| 7,593,230 B2 | 9/2009 | Abul-Haj et al. | |
| 7,601,452 B2 | 10/2009 | Goebel | |
| 7,615,308 B2 | 11/2009 | Frederiksen et al. | |
| 7,618,734 B2 | 11/2009 | Rapaport et al. | |
| 7,687,183 B2 | 3/2010 | Lai | |
| 7,718,298 B2 | 5/2010 | Tighe et al. | |
| 7,781,087 B2 | 8/2010 | Rock et al. | |
| 7,838,139 B2 | 11/2010 | Turpin et al. | |
| 7,838,169 B2 | 11/2010 | Montie et al. | |
| 7,883,813 B2 | 2/2011 | Fyle et al. | |
| 8,026,013 B2 | 9/2011 | Valensa et al. | |
| 8,026,020 B2 | 9/2011 | Spink et al. | |
| 8,157,527 B2 | 4/2012 | Piggush et al. | |
| 8,557,462 B2 | 10/2013 | An et al. | |
| 9,644,277 B2 | 5/2017 | MacKinnon et al. | |
| 9,761,896 B2 | 9/2017 | Taruya et al. | |
| 2001/0003302 A1 | 6/2001 | Azar | |
| 2001/0003309 A1 | 6/2001 | Aoyagi et al. | |
| 2001/0041281 A1 | 11/2001 | Wilkinson et al. | |
| 2002/0012463 A1 | 1/2002 | Yamada | |
| 2002/0017463 A1 | 2/2002 | Merida-Donis | |
| 2003/0041444 A1 | 3/2003 | Debe et al. | |
| 2003/0059662 A1 | 3/2003 | Debe et al. | |
| 2003/0077501 A1 | 4/2003 | Knights et al. | |
| 2003/0134174 A1 | 7/2003 | Akikusa et al. | |
| 2003/0186106 A1 | 10/2003 | Frank et al. | |
| 2004/0023100 A1 | 2/2004 | Boff et al. | |
| 2004/0067405 A1 | 4/2004 | Turpin et al. | |
| 2004/0099045 A1 | 5/2004 | Demarest et al. | |
| 2004/0101736 A1 | 5/2004 | Tawfik et al. | |
| 2004/0142225 A1 | 7/2004 | Turpin et al. | |
| 2004/0209150 A1 | 10/2004 | Rock et al. | |
| 2005/0026022 A1 | 2/2005 | Joos | |
| 2005/0064263 A1 | 3/2005 | Goebel et al. | |
| 2005/0081552 A1 | 4/2005 | Nilson et al. | |
| 2005/0087326 A1 | 4/2005 | Barmoav et al. | |
| 2005/0112428 A1 | 5/2005 | Freeman et al. | |
| 2005/0115825 A1 | 6/2005 | Frank et al. | |
| 2005/0123821 A1 | 6/2005 | Al-Quattan et al. | |
| 2005/0142425 A1 | 6/2005 | Homma | |
| 2005/0221152 A1 | 10/2005 | Turpin et al. | |
| 2005/0271909 A1 | 12/2005 | Bai et al. | |
| 2006/0093891 A1 | 5/2006 | Issacci et al. | |
| 2006/0154125 A1 | 7/2006 | Na et al. | |
| 2006/0234107 A1 | 10/2006 | Leger et al. | |
| 2006/0257704 A1 | 11/2006 | Ogino et al. | |
| 2007/0009781 A1 | 1/2007 | Dong | |
| 2007/0099062 A1 | 5/2007 | Leonida | |
| 2007/0105000 A1 | 5/2007 | Chapman et al. | |
| 2007/0178359 A1 | 8/2007 | Peng et al. | |
| 2007/0289718 A1 | 12/2007 | McCordic et al. | |
| 2008/0008916 A1 | 1/2008 | Shin et al. | |
| 2008/0066888 A1 | 3/2008 | Tong et al. | |
| 2008/0070080 A1 | 3/2008 | Miyazaki | |
| 2008/0096083 A1 | 4/2008 | Kuan et al. | |
| 2008/0107946 A1 | 5/2008 | Gunji et al. | |
| 2008/0135402 A1 | 6/2008 | Jupudi et al. | |
| 2008/0213648 A1 | 9/2008 | Montie et al. | |
| 2008/0248367 A1 | 10/2008 | Chou et al. | |
| 2008/0248371 A1 | 10/2008 | Weng et al. | |
| 2008/0280177 A1 | 11/2008 | Ose et al. | |
| 2008/0311461 A1 | 12/2008 | Farrington et al. | |
| 2009/0035616 A1 | 2/2009 | Darling et al. | |
| 2009/0053570 A1 | 2/2009 | Tian et al. | |
| 2009/0081516 A1 | 3/2009 | Watanabe et al. | |
| 2009/0145581 A1 | 6/2009 | Hoffman et al. | |
| 2009/0208803 A1 | 8/2009 | Farrington | |
| 2009/0258256 A1 | 10/2009 | Limbeck et al. | |
| 2010/0119909 A1 | 5/2010 | McElroy et al. | |
| 2010/0178581 A1 | 7/2010 | An et al. | |
| 2010/0190087 A1 | 7/2010 | Yoshida et al. | |

(56) References Cited

U.S. PATENT DOCUMENTS

| | | |
|---|---|---|
| 2010/0203399 A1 | 8/2010 | Poshusta et al. |
| 2010/0216044 A1 | 8/2010 | Hawkins et al. |
| 2010/0279189 A1 | 11/2010 | Wang et al. |
| 2011/0003222 A1 | 1/2011 | Margiott et al. |
| 2011/0076585 A1 | 3/2011 | Edmonston et al. |
| 2011/0079370 A1 | 4/2011 | Wen et al. |
| 2011/0097648 A1 | 4/2011 | Blank |
| 2011/0159396 A1 | 6/2011 | Kleemann et al. |
| 2011/0171023 A1 | 7/2011 | Lee et al. |
| 2011/0171551 A1 | 7/2011 | Burmeister et al. |
| 2011/0177417 A1 | 7/2011 | Wolk et al. |
| 2011/0223507 A1 | 9/2011 | LaVen et al. |
| 2011/0223508 A1 | 9/2011 | Arnold |
| 2011/0232885 A1 | 9/2011 | Kaslusky et al. |
| 2011/0262826 A1 | 10/2011 | Dadheech et al. |
| 2011/0269037 A1 | 11/2011 | Burmeister et al. |
| 2012/0040260 A1 | 2/2012 | Morita et al. |
| 2012/0040268 A1 | 2/2012 | Okanishi et al. |
| 2012/0107714 A1 | 5/2012 | Day et al. |
| 2012/0308911 A1 | 12/2012 | Peled |
| 2013/0149625 A1 | 6/2013 | Ikeya |
| 2013/0252116 A1 | 9/2013 | Zhang et al. |
| 2014/0193738 A1 | 7/2014 | Rouillon et al. |
| 2014/0329164 A1 | 11/2014 | Utsunomiya et al. |
| 2015/0037704 A1 | 2/2015 | Iritsuki et al. |
| 2015/0180052 A1* | 6/2015 | Leger .......... H01M 8/1011 429/479 |
| 2015/0180079 A1 | 8/2015 | Leger et al. |
| 2015/0349353 A1* | 12/2015 | Hood .......... H01M 8/2483 429/514 |
| 2016/0190620 A1 | 6/2016 | Kwon et al. |
| 2017/0077531 A1 | 3/2017 | Kim et al. |
| 2017/0117561 A1 | 4/2017 | Wakabayashi et al. |
| 2018/0339080 A1 | 11/2018 | Tak |
| 2019/0140289 A1 | 5/2019 | Leger et al. |
| 2023/0006223 A1 | 1/2023 | MacKinnon et al. |

FOREIGN PATENT DOCUMENTS

| | | | |
|---|---|---|---|
| CA | 2437892 | A1 | 8/2002 |
| CA | 2441087 | A1 | 10/2002 |
| CA | 2456731 | A1 | 8/2004 |
| CA | 2880560 | A1 | 7/2006 |
| CA | 2653148 | A1 | 8/2009 |
| CA | 2787467 | A1 | 7/2011 |
| CA | 2925051 | A1 | 4/2014 |
| CA | 3019139 | A1 | 10/2017 |
| CA | 3068413 | A1 | 1/2019 |
| CN | 1491446 | A | 4/2004 |
| CN | 1663067 | A | 8/2005 |
| CN | 101099253 | A | 1/2008 |
| CN | 101253645 | A | 8/2008 |
| CN | 102035002 | A | 4/2011 |
| CN | 102089911 | A | 6/2011 |
| CN | 102623730 | A | 8/2012 |
| CN | 104718651 | A | 6/2015 |
| DE | 10054444 | A1 | 10/2007 |
| EP | 0207799 | A2 | 1/1987 |
| EP | 0355420 | B1 | 10/1993 |
| EP | 0616380 | A1 | 9/1994 |
| EP | 0694216 | B1 | 1/1996 |
| EP | 1496558 | A1 | 1/2005 |
| EP | 1410455 | B1 | 8/2006 |
| EP | 1756899 | A1 | 2/2007 |
| EP | 1512192 | B1 | 5/2008 |
| EP | 2113731 | A1 | 11/2009 |
| EP | 2826092 | B1 | 1/2015 |
| EP | 3678243 | A1 | 7/2020 |
| JP | 861256568 | A | 11/1986 |
| JP | S61256568 | A | 11/1986 |
| JP | H3276569 | A | 12/1991 |
| JP | H4370664 | A | 12/1992 |
| JP | H6267564 | A | 9/1994 |
| JP | H9050817 | A | 2/1997 |
| JP | H11016590 | A | 1/1999 |
| JP | H132001006717 | A | 1/2001 |
| JP | 2001291522 | A | 10/2001 |
| JP | 2003092121 | A | 3/2003 |
| JP | 2005268110 | A | 9/2005 |
| JP | 2005536033 | A | 11/2005 |
| JP | 2008010179 | A | 1/2008 |
| JP | 2008502112 | A | 1/2008 |
| JP | H202008081761 | A | 4/2008 |
| JP | 2008103168 | A | 5/2008 |
| JP | 2008108571 | A | 5/2008 |
| JP | 2009081061 | A | 4/2009 |
| JP | H222010243102 | A | 10/2010 |
| JP | H245029813 | B2 | 9/2012 |
| JP | H242012237068 | A | 12/2012 |
| JP | H292017152174 | A | 8/2017 |
| KR | 10-2006-0059461 | A | 6/2006 |
| KR | 20160144636 | A | 12/2016 |
| WO | 2000026981 | A1 | 5/2000 |
| WO | WO 2000026981 | A1 | 5/2000 |
| WO | 2002065565 | A2 | 8/2002 |
| WO | 2002065566 | A1 | 8/2002 |
| WO | WO 2002065565 | A2 | 8/2002 |
| WO | WO 2002065566 | A1 | 8/2002 |
| WO | 2002089244 | A1 | 11/2002 |
| WO | WO 2002089244 | A1 | 11/2002 |
| WO | 2004114446 | A1 | 12/2004 |
| WO | WO 2004114446 | A1 | 12/2004 |
| WO | 2006120027 | A1 | 11/2006 |
| WO | WO 2006120027 | A1 | 11/2006 |
| WO | 2011028389 | A2 | 3/2011 |
| WO | WO 2011028389 | A2 | 3/2011 |
| WO | 2014026287 | A1 | 2/2014 |
| WO | WO 2014026287 | A1 | 2/2014 |
| WO | 2014056110 | A1 | 4/2014 |
| WO | WO 2014056110 | A1 | 4/2014 |
| WO | 2017161449 | A1 | 9/2017 |
| WO | WO 2017161449 | A1 | 9/2017 |
| WO | 2019046108 | A2 | 3/2019 |
| WO | WO 2019046108 | A2 | 3/2019 |
| WO | 2022094717 | A1 | 5/2022 |
| WO | WO 2022094717 | A1 | 5/2022 |
| WO | 2022213214 | A1 | 10/2022 |
| WO | 2023044562 | A1 | 3/2023 |

OTHER PUBLICATIONS

Examination Report issued in connection with European App. No. 17769212.6 dated Apr. 26, 2021.

CA App. No. 3,123,208; Office Action dated Apr. 29, 2022 ("20220429CAOA").

PCT/CA2022/050549; International Search Report and Written Opinion dated Jul. 11, 2022 ("20220711ISR").

Choudhary, V, et al., "Decomposition and/or Hydrogenation of Hydrogen Peroxide Over Pd/Al$_2$O$_2$ Catalyst in Aqueous Medium: Factors Affecting the Rate of H$_2$O$_2$ Destruction in Presence of Hydrogen", Applied Catalysis A: General 332, 2007, pp. 70-78.

Samanta, C, "Direct Synthesis of Hydrogen Peroxide from Hydrogen and Oxygen: An Overview of Recent Developments in the Process", Applied Catalysis A: General 350, 2008, pp. 133-149.

Sun, K, et al. "Vehicle Emissions as an Important Urban Ammonia Source in the United States and China", Environ. Sci. Technol. 51, 2017, pp. 2472-2481.

Gomez, Y, et al., "Ammonia Contamination of a Proton Exchange Membrane Fuel Cell", J. of the Electrochem. Soc., 165, 2018, pp. F189-F197.

Office Action dated Apr. 29, 2022, issued in connection with Canadian Application No. 3,123,208.

International Search Report dated Jul. 11, 2022, in connection with International Application No. PCT/CA2022/050549.

PCT/CA2021/051575; International Search Report and Written Opinion dated Jan. 27, 2022 ("20220127ISR").

U.S. Appl. No. 16/861,268; Office Action dated Oct. 21, 2021 ("20211021USOA"), Office Action dated Feb. 14, 2022 ("20220214USOA").

(56) References Cited

OTHER PUBLICATIONS

International Search Report dated Jan. 27, 2022, in connection with International Application No. PCT/CA2021/051575.
Claiborne, H.C., "Heat Transfer in Non-Circular Ducts", Oak Ridge National Laboratory operated by Carbide and Carbon Chemicals Co., 1951, pp. 1-43.
Montgomery, S.R. et al., "Laminar Flow Heat Transfer for Simultaneously Developing Velocity and Temperature Profiles in Ducts of Rectangular Cross Section", Appl. Sci. Res., vol. 18, 1967, pp. 247-259.
Barrow, H. et al., "The Effect of Velocity Distribution on Forced Convection Laminar Flow Heat Transfer in a Pipe at Constant Wall Temperature", Warme und Stoffubertragung, Bd. 3, 1970, pp. 227-231.
Biber, C. R., "Pressure Drop and Heat Transfer in an Isothermal Channel with Impinging Flow", IEEE Transactions on Components, Packaging, and Manufacturing Technology Part A, vol. 20(4), 1997, pp. 458-462.
Soule, C. A., "Future Trends in Heat Sink Design", https://www.electronics-cooling.com/2001/02/future-trends-in-heat-sink-design/, 2001, accessed Dec. 6, 2018.
Banker, R., et al., "Experimental and Computational Investigation of the Hydrodynamics and Heat Transfer in a Flat Channel of Variable Width for Smooth and Intensified Surfaces", Heat Transfer Research, vol. 35, 2004, pp. 1-10.
Sammes, N., ed. Fuel cell technology: reaching towards commercialization. Springer Science & Business Media (2006).
Marangio et al., "Theoretical model and experimental analysis of a high pressure PEM water electrolyser for hydrogen production", International Journal of Hydrogen Energy, 2009, vol. 34, pp. 1143-1158.
Brodmann, et al., "Modular Fuel Cell System", 18th World Hydrogen Energy Conference 2010, pp. 137-140.
Hydrogenics, "HyPM Fuel Cell Power Modules", Mar. 2010.
Remick, "Reversible Fuel Cells Workshop Summary Report", U.S. Department of Energy, 2011, pp. 1-150.
Hwang et al., "Flow Field Design for a Polymer Electrolyte Unitized Reversible Fuel Cell", Honolulu PRiME, 2012, Abstract #1405.
Hydrogenics, "HyPM-HD Power Modules for light and heavy duty mobility", 2012.
Koz, M. et al., "A Preliminary Study for 3D Numerical Simulation of a Throughplane Temperature Profile in a PEMFC Incorporating Coolant Channels", Proceedings of the ASME 2012 10th International Conference on Nanochemicals, Microchannels, and Minichannels, ICNNM12, Jul. 8-12, 2012, Rio Grande, Puerto Rico, pp. 1-10.
Bonghwan et al., "Dynamic Simulation of PEM Water Electrolysis and Comparison with Experiments", Int. J. Electrochem. Sci., 2013, vol. 8, pp. 235-248.
Kuan, et al., "Heat-Transfer Analysis of a Water-Cooled Channel for the TPS Front-End Components", THPF1072, Proceedings of IPAC2013, Shanghai, China, 2013, pp. 3466-3468.
Hydrogenics, "Hydrogenics Marine Applications: Electrolysers and Fuel Cell Power Modules", Apr. 2013.
International Search Report and Written Opinion dated Sep. 24, 2013 in connection with International Application No. PCT/CA2013/050626.
International Search Report dated Nov. 13, 2013 in connection with International Application No. PCT/CA2013/050627.
International Search Report dated Nov. 15, 2013 in connection with International Application No. PCT/CA2013/050769.
International Preliminary Report on Patentability dated Feb. 26, 2015 in connection with International Application No. PCT/CA2013/050626.
International Preliminary Report dated Feb. 26, 2015 in connection with International Application No. PCT/CA2013/050627.
International Preliminary Report on Patentability dated Apr. 23, 2015 in connection with International Application No. PCT/CA2013/050769.
Office Action dated Oct. 10, 2016 in connection with Chinese Patent Application No. 201380064598.4.
Office Action dated Oct. 17, 2016 in connection with Chinese Patent Application No. 201380053699.1.
International Search Report and Written Opinion dated Jun. 15, 2017 in connection with International Application No. PCT/CA2017/050358.
International Preliminary Report on Patentability dated Jun. 27, 2018 in connection with International Application No. PCT/CA2017/050358.
Examination Report issued in connection with Canadian App. No. 2,919,875 dated Jun. 10, 2019.
Examination Report issued in connection with Canadian App. No. 2,925,051 dated Aug. 6, 2019.
The Extended European Search Report issued by the European Patent Office dated Oct. 18, 2019 in connection with European patent application No. 17769212.6.
Office Action issued in connection with CA App. No. 2,919,875 dated Feb. 7, 2020.
Examination Report issued in connection with UK App. No. GB1503750.0 dated Feb. 24, 2020.
1st Office Action issued in connection with Chinese App. No. 201710699586.9 dated Feb. 25, 2020.
1st Office Action issued in connection with Chinese App. No. 201710699589.2 dated Mar. 3, 2020.
Examination Report issued in connection with UK App. No. GB1503751.8 dated Mar. 18, 2020.
1st Office Action issued in connection with Chinese App. No. 201711004994.4 dated Mar. 24, 2020.
Office Action issued in connection with Canadian App. No. 2,925,051 dated Apr. 30, 2020.
Examination Report issued in connection with UK App. No. GB1507832.2 dated Jun. 30, 2020.
Examination Report issued in connection with Canadian App. No 2,919,875 dated Aug. 14, 2020.
Examination Report issued in connection with Indian App. No. 201837035491 dated Aug. 14, 2020.
Examination Report issued in connection with UK App. No. GB1503751.8 dated Sep. 1, 2020.
Notice of Allowance issued in connection with CN App. No. 201710699586.9 dated Sep. 4, 2020.
2nd Office Action issued in connection with Chinese App. No. 201711004994.4 dated Dec. 22, 2020.
1st Office Action issued in connection with Chinese App. No. 201780018272.6 dated Dec. 29, 2020.
EP App. No. 17769212.6; Examination Report dated Apr. 26, 2021 ("20210426EPER").
JP App. No. 2018549209; Japanese Office Action dated Mar. 5, 2021 ("20210305JPOA").
U.S. Appl. No. 15/485,195; Notice of Allowance dated Mar. 1, 2021 ("20210301NOA").
Examination Report issued in connection with European App. No. 17759212.6 dated Apr. 26, 2021.
CA App. No. 2,919.875; Office Action dated Jun. 10, 2019 ("20190610CAOA"), Office Action dated Feb. 7, 2020 ("20200207CAOA"), Office Action dated Aug. 14, 2020 ("20200814CAOA").
CA App. No. 2,925,051; Office Action dated Aug. 6, 2019 ("20190806CAOA"), Office Action dated Apr. 30, 2020 ("20200430CAOA").
CN App. No. 201380053699.1; Office Action dated Oct. 17, 2016 ("20161017CNOA").
CN App. No. 201380064598.4; Office Action dated Oct. 10, 2016 ("20161010CNOA").
CN App. No. 201711004994.4; 1st Office Action dated Mar. 24, 2020 ("20200324CNOA"), $2^{nd}$ Office Action dated Dec. 22, 2020 ("20201222CNOA").
CN App. No. 201710699586.9; $1^{st}$ Office Action dated Feb. 25, 2020 ("20200225CNOA"), Notice of Allowance dated Sep. 4, 2019 ("20200904N0A").
CN App. No. 201710699589.2; $1^{st}$ Office Action dated Mar. 3, 2020 ("20200303CNOA").
CN App. No. 201780018272.6; $1^{st}$ Office Action dated Dec. 29, 2020 ("20201229CNOA").

(56) References Cited

OTHER PUBLICATIONS

EP App. No. 17769212.6; Extended European Search Report dated Oct. 18, 2019 ("20191018EESR").
IN App. No. 201837035491; Indian Examination Report dated Aug. 14, 2020 ("20200814INER").
PCT/CA2013/050626; International Search Report and Written Opinion dated Sep. 24, 2013 ("20130924ISR"), International Preliminary Report on Patentability dated Feb. 26, 2015 ("20150226IPRP").
PCT/CA2013/050627; International Search Report and Written Opinion Nov. 13, 2013 ("20131113ISR"), International Preliminary Report on Patentability dated Feb. 26, 2015 ("20150226IPRPb").
PCT/CA2013/050769; International Search Report and Written Opinion dated Nov. 15, 2013 ("20131115ISR"), International Preliminary Report on Patentability dated Apr. 23, 2015 ("20150423IPRP").
PCT/CA2017/050358; International Search Report and Written Opinion dated Jun. 15, 2017 ("20170615ISR"), International Preliminary Report on Patentability dated Jun. 27, 2018 ("20180627IPRP").
U.S. Appl. No. 14/621,399; Office Action dated Sep. 1, 2017 ("20170901USOA"), Notice of Allowance dated Apr. 23, 2018 ("20180423USOA").
U.S. Appl. No. 14/622,830; Office Action dated Jul. 14, 2016 ("20160714USOA"), Office Action dated Mar. 14, 2017 ("20170314USOA"), Office Action dated Dec. 8, 2017 ("20171208USOA"), Office Action dated Jul. 11, 2018 ("20180711USOA"), Office Action dated Mar. 26, 2019 ("20190326USOA"), Notice of Allowance dated Jan. 31, 2020 ("20200131N0A").
U.S. Appl. No. 14/683,450; Office Action dated Aug. 26, 2016 ("20160826USOA"), Notice of Allowance dated Jan. 5, 2017 ("20170105N0A").
U.S. Appl. No. 15/485,195, Office Action dated on May 15, 2019 ("20190515USOA"), Office Action dated on Dec. 31, 2019 ("20191231USOA"), Advisory Action dated Mar. 26, 2020 ("20200326AA"), Office Action dated on Jun. 23, 2020 ("20200623USOA").
U.S. Appl. No. 16/011,867; Notice of Allowance dated Mar. 27, 2020 ("20200327N0A").
U.S. Appl. No. 16/138,149; Office Action dated Feb. 26, 2020 ("20200226USOA"), Office Action dated Aug. 4, 2020 ("20200804USOA"), Notice of Allowance dated Oct. 21, 2020 ("20201021N0A").
UK App. No. GB1503750.0; Examination Report dated Feb. 24, 2020 ("20200224UKOA").
UK Ann. No. GB1503751.8.
Examination Report dated Mar. 18, 2020 ("20200318UKOA"), Examination Report dated Sep. 1, 2020 ("20200901UKOA").
Examination Report dated Jun. 30, 2020 ("20200630UKOA").
Barrow, H. et al., "The Effect of Velocity Distribution on Forced Convection Laminar Flow Heat Transfer in a Pipe at Constant Wall Temperature", Warme and Stoffubertragung, Bd. 3, 1970, pp. 227-231.
Lee et al. "The Effects of Compression and Gas Diffusion Layers on the Performance of a PEM Fuel Cell", J. of Power Sources, 84, 1999, pp. 45-51.
Mikkola et al. "Modeling the Internal Pressure Distribution of a Fuel Cell", New Energy Technologies Group Department of Applied Physics, Helsinki University of Technology, 2009.
Montanini et al., "Experimental Evaluation of the Clamping Pressure Distribution in a PEM Fuel Cell Using Matrix-Based Piezoresistive Thin-Film Sensors", Fundamental and Applied Metrology., 2009, pp. 2039-2044.
Ghosh et al. "Influences of Contact Pressure on the Performances of Polymer Electrolyte Fuel Cells", J. of Energy, vol. 2013, pp. 1-11.
Muthukumar et al. "Numerical Studies on PEM Fuel Cell with Different Landing to Channel Width of Flow Channel", Procedia Engineering, 97, 2014, pp. 1534-1542.
De La Cruz et al. "Simulation and in Situ Measurement of Stress Distribution in a Polymer Electrolyte Membrane Fuel Cell Stack", J. of Power Sources, 329, 2016, pp. 273-280.
Alizadeh et al. "Investigation of Contact Pressure Distribution Over the Active Area of PEM Fuel Cell Stack", International Journal of Hydrogen Energy, vol. 41, Issue 4, (2016), pp. 3062-3071.
Simon et al. "Influence of the Gas Diffusion Layer Compression on the Oxygen Transport in PEM Fuel Cells at High Water Saturation Levels", J. of the Electrochemical Society, 164 (6), 2017, pp. F591-F599.
Chowdhury et al., "Numerical Optimization of Channel to Land Width Ratio for PEM Fuel Cell", Int. J. of Hydrogen Energy, 43, 2018, pp. 10798-10809.
Randrianarizafy et al. "Design Optimization of Rib/Channel Patterns in a PEMFC through Performance Heterogeneities Modelling", International J. of Hydrogen Energy 43, 2018, pp. 8907-8926.
Kulkarni et al. "The Effect of Non-Uniform Compression and Flow-Field Arrangements on Membrane Electrode Assemblies—X-ray Computed Tomography Characterisation and Effective Parameter Determination", Journal of Power Sources, vol. 426, 2019, pp. 97-110.
Dey et al. "Study of PEM Fuel Cell End Plate Design by Structural Analysis Based on Contact Pressure", J.of Energy, Jan. 2, 2019, pp. 1-11.
Zhang et al. "Experimental Studies of Effect of Land Width in PEM Fuel Cells with Serpentine Flow Field and Carbon Cloth", Energies 12, 471, Feb. 1, 2019, pp. 1-10.
Qiu et al. "An Intelligent Approach for Contact Pressure Optimization of PEM Fuel Cell Gas Diffusion Layers", Applied Sciences, Issue 10, vol. 4194, 2020, pp. 1-14.
Office Action issued in connection with Canadian App. No. 3,016,102 dated Jun. 15, 2023.
Office Action issued in connection with Canadian App. No. 3,123,208 dated Dec. 16, 2022.
International Search Report and Written Opinion dated Dec. 22, 2022, in connection with International Application No. PCT/CA2022/051394.

\* cited by examiner

FUEL CELL FLOW FIELD DESIGN FOR THERMAL MANAGEMENT

CROSS-REFERENCE TO RELATED APPLICATION

This application is a continuation of and claims priority to U.S. patent application Ser. No. 16/138,149 filed on Sep. 21, 2018 entitled, "Fuel Cell Flow Field Design For Thermal Management". The '149 application is a continuation of and claims priority benefits from International application No. PCT/CA2017/050358 filed on Mar. 21, 2017 also entitled, "Fuel Cell Flow Field Design For Thermal Management" which, in turn, claims priority benefits from U.S. provisional application No. 62/311,901 filed on Mar. 22, 2016 also entitled, "Fuel Cell Flow Field Design For Thermal Management". The '149, '358 and '901 applications are each hereby incorporated by reference herein in their entireties.

FIELD OF THE INVENTION

The present invention relates generally to electrochemical fuel cells and, more specifically, to an electrochemical fuel cell wherein the design of the coolant flow field plate provides improved thermal management.

BACKGROUND OF THE INVENTION

Temperature control, and devices designed to provide heating and cooling, are at the heart of many consumer and industrial products. Such products include micro-processors, automobiles, fuel cells, furnaces, hot water heaters, cellular devices, and industrial equipment. These devices make use of some type of heat exchanger to transfer heat from one place to another.

A heat exchanger is a device that transfers heat from one medium to another through a heat transfer surface. The heat transfer distribution across the heat transfer surface is dependent on the temperature difference between surface and fluid, exchanger surface area, exchanger mass flow, exchanger flow configuration, material properties, and heat transfer mode, among other things.

One common mode of thermal management is through forced convective heat transfer. Here, a working fluid, which is either hotter or colder than the heat transfer surface (depending on whether the application is for heating or cooling) is pumped over the heat transfer surface. As it flows over the heat transfer surface, the working fluid temperature changes, thereby reducing the temperature difference between the working fluid and the heat transfer surface. If the heat transfer surface is maintained at a constant temperature, then heat is transferred to the working fluid non-uniformly over the heat transfer surface.

It is desirable for some applications for a heat transfer surface to be maintained at a constant temperature and the heat transfer to be substantially uniform. One approach to achieving this is to use a working fluid with a high thermal mass. Working fluids with higher density and higher heat capacity typically have higher thermal masses. For example, water has a higher thermal mass than air. Using a working fluid with a high thermal mass can reduce the variation over the heat transfer surface of the temperature difference between the working fluid and the heat transfer surface, but does not eliminate it entirely. Furthermore, fluids with higher density or higher thermal mass can be associated with higher parasitic loads; for example, for pumping or otherwise moving the fluid across the heat transfer surface.

Another approach to maintaining a heat transfer surface at a constant temperature is to use a working fluid that undergoes a phase change (for example, by heating a liquid to cause it to evaporate). A disadvantage of using a working fluid that undergoes a phase change is that the operating conditions of the heat exchanger can be restricted to temperature ranges dependent on the physical properties of the working fluid and can be limited by the phase energy capacity of the working fluid.

Solid polymer fuel cells are electrochemical devices that produce electrical power and water from a fuel, such as hydrogen, and oxygen. A single solid polymer fuel cell comprises an ion exchange membrane separating an anode and a cathode. The anode-membrane-cathode assembly, or "membrane electrode assembly", is interposed between a pair of electrically conductive reactant flow field plates that collect current, facilitate the access of the fuel and oxidant to the anode and cathode surfaces, respectively, and provide for the removal of water formed during the operation of the fuel cell. A plurality of fuel cell assemblies are usually arranged to form a fuel cell stack.

The fuel cell reaction is exothermic, and the operating temperature of conventional solid polymer fuel cells is often regulated by a coolant fluid circulation system. To maintain an appropriate cell temperature, coolant channels are generally interposed between the reactant flow field plates of adjacent fuel cell pairs in a fuel cell stack. The channels can be formed in the reactant flow field plates or in separate coolant plates. A coolant fluid (commonly water or air) is directed through the coolant channels to absorb heat energy released by the exothermic electrochemical reaction within the fuel cells. The heat is transferred to the coolant as a result of the thermal gradient between the reaction site and the coolant.

In conventional fuel cells, power is not produced evenly across the fuel cell active area. In other words, the fuel cell does not generally operate with uniform current density. Fuel cell cooling systems are generally designed to try to reduce the non-uniformity of temperature distribution that occurs across an operating fuel cell. Thus, conventional fuel cell cooling systems are deliberately non-uniform, with the heat flux varying across the heat transfer area, to compensate for non-uniform production of heat. In other words, the cooling system is configured so that there is a greater capacity for cooling in the region of the fuel cell where the most heat is being generated.

More recently, fuel cells have been developed that are capable of operating with substantially uniform current density. Thermal management of such fuel cells can be challenging. Use of conventional fuel cell cooling systems will tend to result in an undesirable thermal gradient across the active area of the fuel cell because heat flux with such conventional cooling systems is not uniform. This can cause problems, including with product water management, particularly at high current densities.

SUMMARY OF THE INVENTION

A fuel cell assembly comprises a plurality of stacked fuel cells, and each fuel cell comprises an anode, a cathode, a proton exchange membrane electrolyte interposed between the anode and the cathode, an anode flow field plate adjacent the anode, the anode flow field plate comprising an anode flow channel for directing fuel to the anode, and a cathode flow field plate adjacent the cathode, the cathode flow field plate comprising a cathode flow channel for directing oxidant to the cathode. The fuel cell assembly further comprises a thermally compensated coolant channel interposed between the cathode flow field plate of one of the fuel cells and the anode flow field plate of an adjacent fuel cell, for directing a coolant in contact with (or in a heat transfer relationship with) at least one of the flow field plates. The thermally compensated coolant channel has a cross-sectional area that decreases in the coolant flow direction along at least a portion of the length of the thermally compensated coolant channel. In some embodiments, the fuel cell assembly comprises a plurality of anode flow channels and/or a plurality of cathode flow channels. In some embodiments, the fuel cell assembly comprises a plurality of thermally compensated coolant channels interposed between the cathode flow field plate of one of the fuel cells and the anode flow field plate of an adjacent fuel cell, for directing a coolant in contact with (or in a heat transfer relationship with) at least one of the flow field plates.

In some embodiments, the cross-sectional area of the thermally compensated coolant channel decreases in a non-linear fashion in the coolant flow direction along at least a portion of the length of the thermally compensated coolant channel.

In some embodiments, the thermally compensated coolant channel has a substantially rectangular cross-section and the width of the thermally compensated coolant channel decreases in a non-linear fashion in the coolant flow direction along at least a portion of the length of the thermally compensated coolant channel.

In some embodiments, the cross-sectional area of the cathode flow channel and/or the anode flow channel decreases in the reactant flow direction along at least a portion of the length of the respective channel. In some such embodiments, the cathode and/or anode flow channel has a substantially rectangular cross-section, and the width of the cathode and/or anode channel decreases in accordance with an exponential function along at least a portion of the length of the respective channel.

In some embodiments of the fuel cell assemblies and methods for operating fuel cell assemblies described herein, the thermally compensated coolant channel can be formed in a coolant flow field plate which is interposed between the cathode flow field plate of one of the fuel cells in the fuel cell assembly and the anode flow field plate of an adjacent fuel cell in the fuel cell assembly. In other embodiments of the fuel cell assemblies and methods for operating fuel cell assemblies described herein, the thermally compensated coolant channel can be formed in the cathode or anode flow field plate on the opposite surface from the at least one reactant flow channel, or can be formed partially in each of the cathode and anode flow field plates so that the thermally compensated coolant channel is formed by the cooperating surfaces of adjacent cathode and anode flow field plates.

In some embodiments of the fuel cell assemblies and methods for operating fuel cell assemblies described herein, the cathode flow field plates are stamped to form a plurality of the cathode flow channels on one side thereof, and/or the anode flow field plates are stamped to form a plurality of the anode flow channels on one side thereof. A plurality of thermally compensated coolant channels can be formed between adjacent pairs of fuel cells in the assembly by the cooperating surfaces of such anode and cathode flow field plates. In some implementations, the cooperating surfaces of the anode and cathode flow field plates are nested.

A method of operating a fuel cell assembly comprising a plurality of fuel cells is provided. Each fuel cell can comprise an anode, a cathode, a proton exchange membrane electrolyte interposed between the anode and the cathode, an anode flow field plate adjacent the anode, the anode flow field plate comprising an anode flow channel for directing fuel to the anode, and a cathode flow field plate adjacent the cathode, the cathode flow field plate comprising a cathode flow channel for directing oxidant to the cathode. The method of operating the fuel cell assembly comprises:

supplying fuel and oxidant to the plurality of fuel cells to generate electrical power from the fuel cells; and directing coolant through a thermally compensated coolant channel interposed between the cathode flow field plate of one of the fuel cells and the anode flow field plate of an adjacent fuel cell, wherein the velocity of the coolant flowing through the thermally compensated coolant channel increases along at least a portion the length of the thermally compensated coolant channel to at least partially compensate for an increase in the temperature of the coolant along that portion of the length of the thermally compensated coolant channel. In some embodiments, the velocity of the coolant flowing through the thermally compensated coolant channel increases along at least a portion the length of the thermally compensated coolant channel to substantially compensate for an increase in the temperature of the coolant along that portion of the length of the thermally compensated coolant channel.

In some embodiments of the method, the fuel cells are operated to generate electrical power with substantially uniform current density across each of the fuel cells. The at least one thermally compensated coolant channel can be configured to provide substantially uniform heat flux to the coolant flowing through at least a portion of the length of the thermally compensated coolant channel, and in some embodiments along the entire length of the thermally compensated coolant channel. In some embodiments, the fuel cells are operated substantially isothermally.

In some embodiments, the cross-sectional area of the thermally compensated coolant channel varies along at least a portion of its length. For example, the cross-sectional area of the thermally compensated coolant channel can decrease in a non-linear fashion in the coolant flow direction along at least a portion of the length of the thermally compensated coolant channel. In some embodiments, the thermally compensated coolant channel has a substantially rectangular cross-section, and the width of the channel decreases in a non-linear fashion in the coolant flow direction along at least a portion of the length of the thermally compensated coolant channel. In some embodiments of the method, the cross-sectional area of the cathode flow channel and/or the anode flow channel decreases in the reactant flow direction along at least a portion of the length of the respective channel. In some such embodiments, the cathode and/or anode flow channel has a substantially rectangular cross-section, and the width of the channel decreases in accordance with an exponential function along at least a portion of the length of the respective channel.

In some embodiments of the fuel cell assemblies and methods of operating fuel cell assemblies described above, characteristics of the thermally compensated coolant channel vary continuously or smoothly as a function of distance along the channel. In other embodiments, characteristics of the thermally compensated coolant channel vary as a function of distance along the channel in a stepwise, discrete or discontinuous manner, for example, to approximately compensate for the increase in the temperature of the working fluid along the length of the channel.

DETAILED DESCRIPTION OF PREFERRED EMBODIMENT(S)

In embodiments of the technology described herein, the velocity of the working fluid over the heat transfer surface is adjusted to control the variation of heat flux (heat transfer per unit area) over the heat transfer surface. The velocity of the working fluid can be adjusted to reduce or eliminate the variation in heat flux over the heat transfer surface. If the heat flux is substantially uniform and heat is produced substantially uniformly by the heat source, then the resulting temperature of the heat transfer surface will also be substantially uniform.

An advantage of achieving uniform temperature of the heat transfer surface and substantially uniform heat flux is that it can increase the heat transfer capacity of the heat exchanger. As a consequence, a working fluid with a lower thermal mass can be used to remove the same amount of heat, thereby reducing the parasitic power losses associated with pumping coolant at a higher flow rate to accommodate a fluid or design with poorer heat transfer characteristics. Another advantage of certain embodiments of the technology described herein is that a phase change is not required to achieve substantially uniform heat flux, and so a wide variety of working fluids and broad range of operating temperatures can be used.

Figure 1:
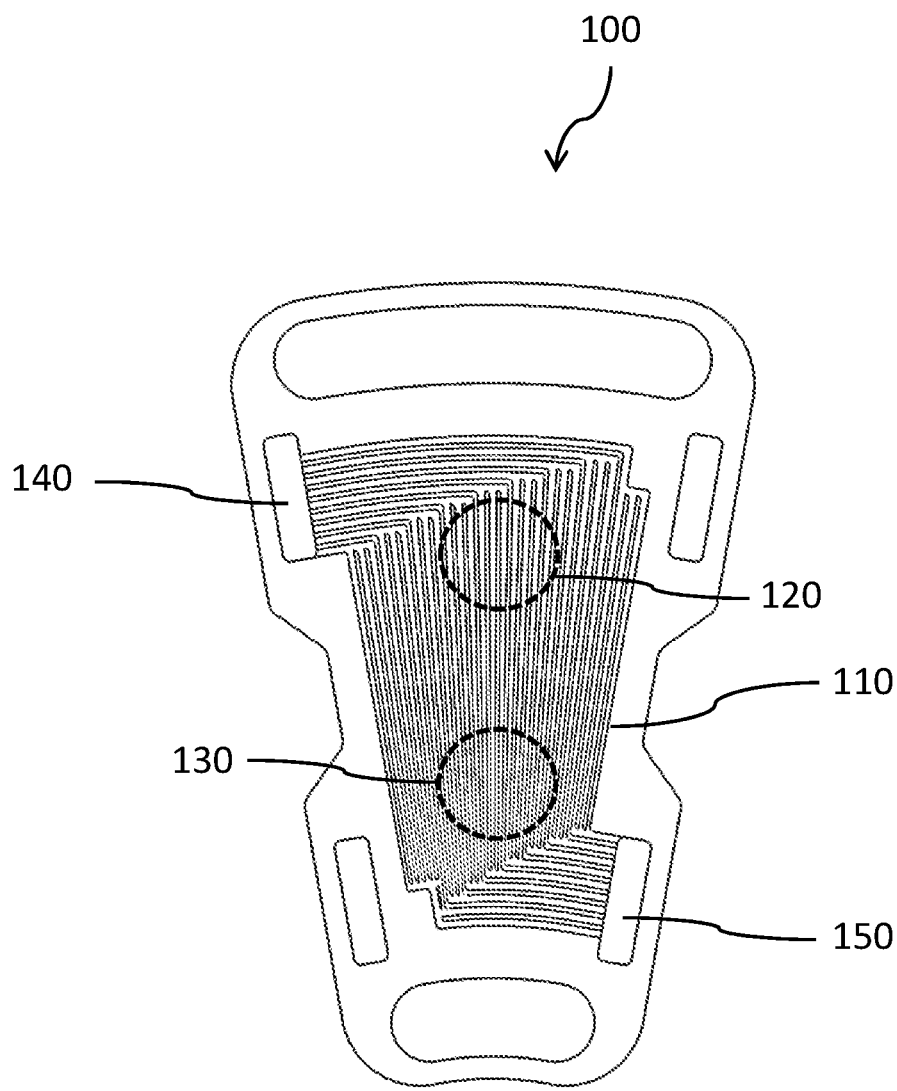
FIG. 1 is a schematic of an embodiment of a fuel cell coolant flow field plate comprising a plurality of thermally compensated channels.

FIG. 1 is a schematic of an embodiment of fuel cell coolant flow field plate 100 comprising a plurality of thermally compensated channels 110. Coolant flow field plate 100 further comprises inlet 140 and outlet 150. Thermally compensated channels 110 are configured such that the width of channels nearer inlet 140, for example, in region 120, is greater than the width of channels nearer outlet 150, for example, in region 130.

Figure 2:
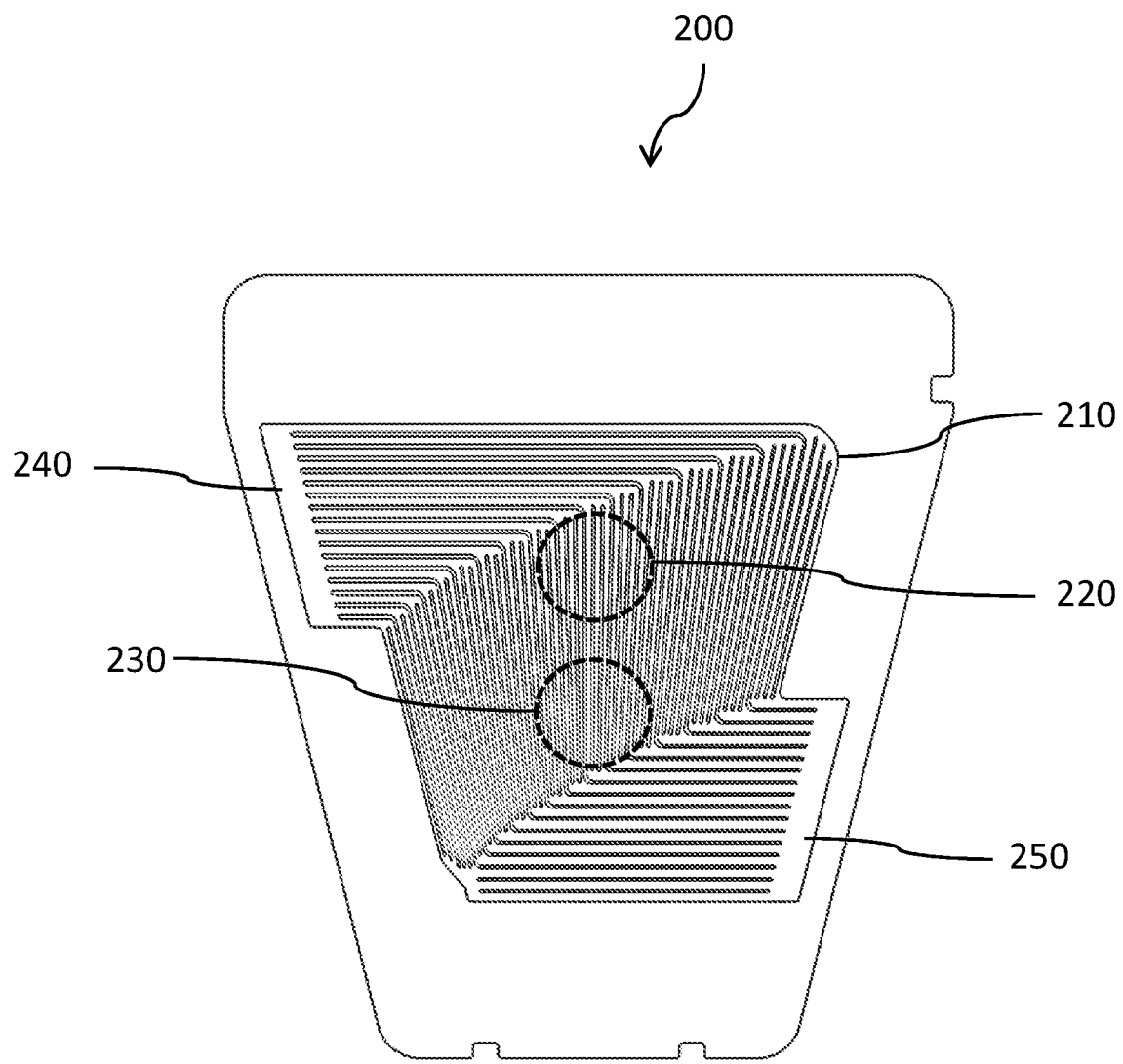
FIG. 2 is a schematic of another embodiment of a fuel cell coolant flow field plate comprising a plurality of thermally compensated channels.

FIG. 2 is a schematic of another embodiment of fuel cell coolant flow field plate 200 comprising a plurality of thermally compensated channels 210. Coolant flow field plate 200 further comprises inlet 240 and outlet 250. Thermally compensated channels 210 are configured such that the width of channels nearer inlet 240, for example, in region 220 is greater than the width of channels nearer outlet 250, for example, in region 230.

In some embodiments, thermally compensated channels (such as 110 of FIG. 1 or 210 of FIG. 2) can have a rectangular cross-section, or they can have a substantially rectangular cross-section, for example with rounded corners and slightly flared side-walls. In other embodiments, thermally compensated channels can have other cross-sectional shapes including, but not limited to, trapezoidal, triangular, semi-circular cross-sections.

Figure 3:
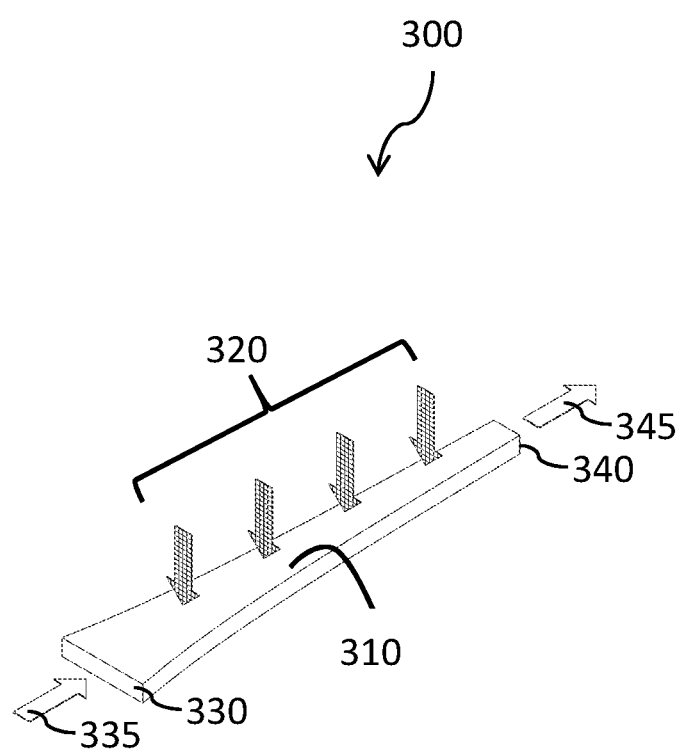
FIG. 3 is a schematic of a thermally compensated channel.

FIG. 3 is schematic of thermally compensated channel 300, such as an individual channel on a coolant flow field plate. Thermally compensated channel 300 has a rectangular cross-section, and comprises heat transfer surface 310. Heat flow across heat transfer surface 310 from a fuel cell (not shown in FIG. 3) is illustrated by arrows 320. The flow of a working fluid entering thermally compensated channel 300 at inlet 330 is illustrated by arrow 335. The flow of a working fluid leaving thermally compensated channel 300 at outlet 340 is illustrated by arrow 345.

Figure 4:
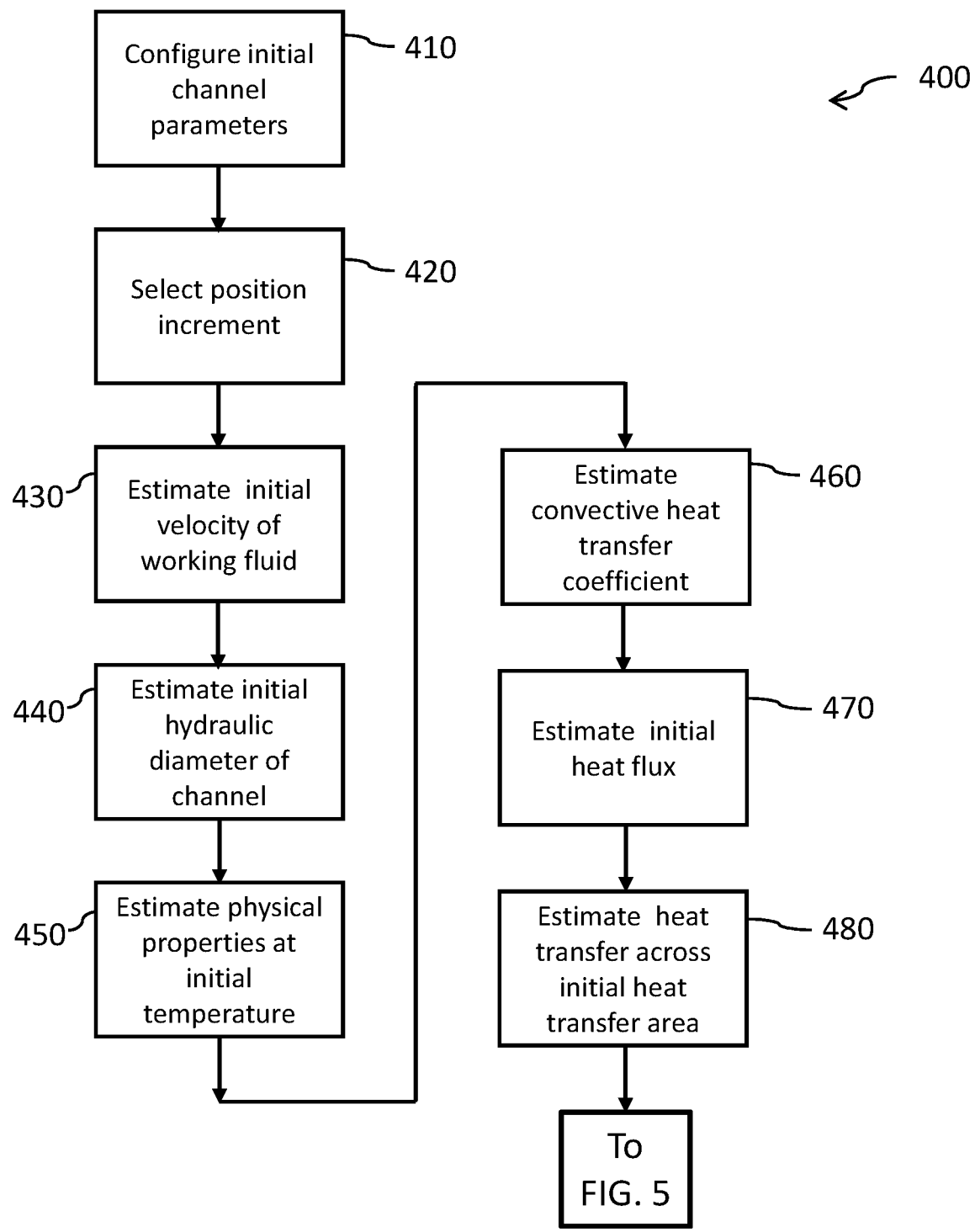
FIGS. 4 and 5 are flowcharts illustrating a method for configuring a thermally compensated channel.
Figure 5:
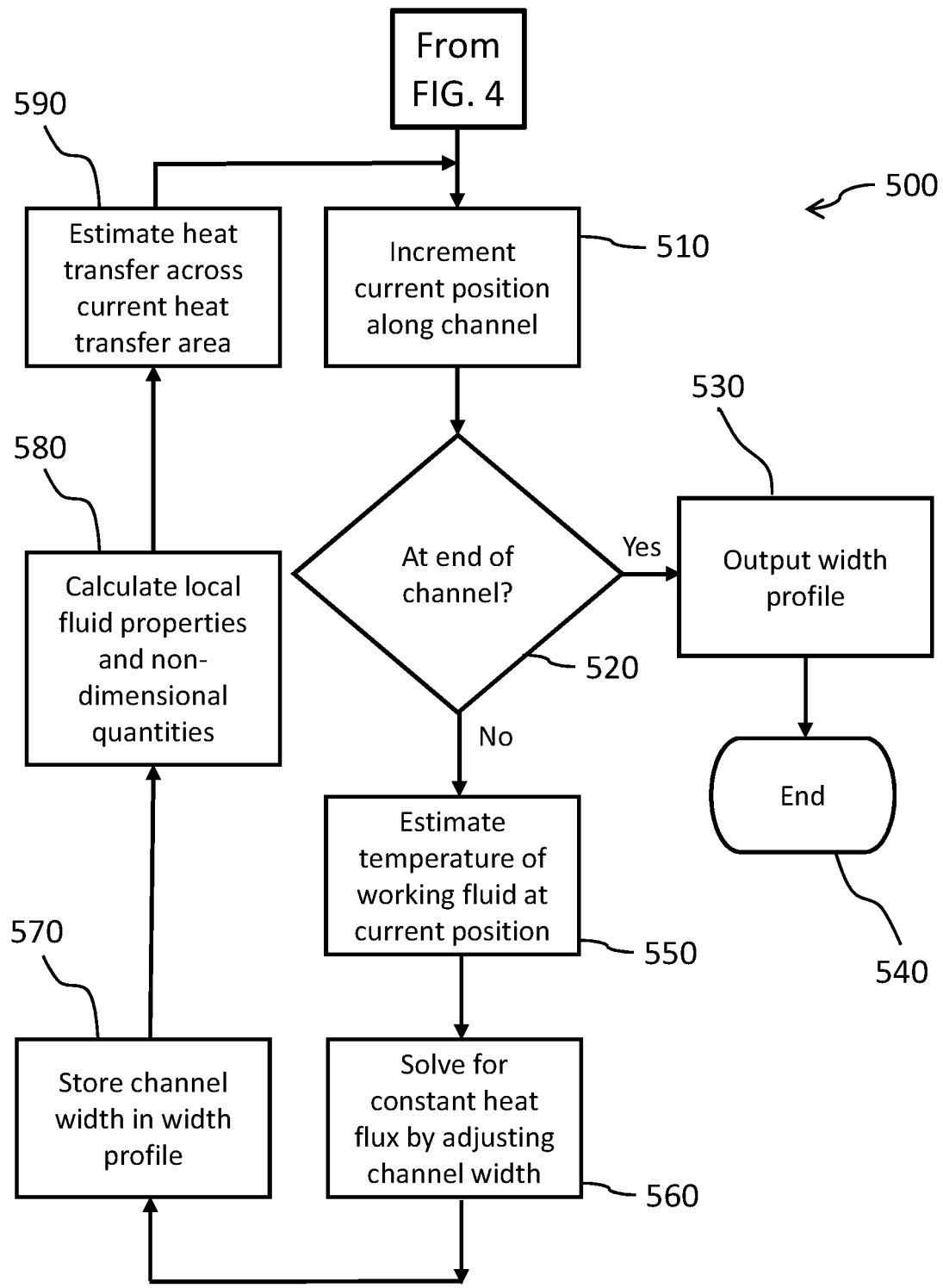

FIGS. 4 and 5 are flowcharts illustrating method 400 for configuring a thermally compensated channel. Method 400 comprises a numerical approach that estimates heat flux at a plurality of equally spaced positions along the length of the channel from the inlet to the outlet.

FIG. 4 is a flowchart illustrating a first part of method 400. The first part of method 400 comprises steps 410 through 480.

At step 410, the channel is configured with an initial set of parameters, the initial set of parameters comprising depth $D_0$ and width $W_0$ at the inlet, length of the channel L, mass flow of the working fluid $\dot{m}$, temperature of the working fluid at the inlet $T_0$, and the wall temperature $T_w$.

At step 420, the incremental distance $\Delta x$ between each of the plurality of equally spaced positions is selected. The incremental distance is selected to provide a desired level of accuracy for the resulting width profile of the channel.

At step 430, method 400 estimates the velocity of the working fluid at the inlet, referred to as the initial velocity $v_0$ of the working fluid, using equation (1), where ṁ is the mass flow rate, and $\rho_0$ is the density of the working fluid at the inlet:

$$v_0 = \frac{\dot{m}}{\rho_0 W_0 D_0} \tag{1}$$

At step 440, method 400 estimates the hydraulic diameter $d_{h0}$ of the channel at the inlet, using equation (2):

$$d_{h0} = \frac{4 W_0 D_0}{2(W_0 + D_0)} \tag{2}$$

At step 450, method 400 estimates the physical properties of the working fluid at the inlet temperature $T_0$. The physical properties comprise density $\rho$, dynamic viscosity $\mu$, specific heat $C_p$, and thermal conductivity $k_{th}$.

At step 460, method 400 estimates the convective heat transfer coefficient $h_0$ at the inlet temperature using equations (3) through (6) as follows:

$$h_0 = \frac{k_{th0} Nu_0}{d_{h0}} \tag{3}$$

$$Nu_0 = 1.86 \left( PrRe \frac{d_{h0}}{L} \right)^{\frac{1}{3}} \left( \frac{\mu_0}{\mu_w} \right)^{0.14} \tag{4}$$

$$Pr_0 = \frac{C_{p0} \mu_0}{k_{th0}} \tag{5}$$

$$Re_0 = \frac{\rho_0 v_0 d_{h0}}{\mu_0} \tag{6}$$

where Nu is the Nusselt number, Re is the Reynolds number, and Pr is the Prandtl number.

At step 470, method 400 estimates the local heat flux, q, using equation (7):

$$q(0) = h_0(T_w - T_0) \tag{7}$$

At step 480, method estimates the heat transfer, Q, across the initial heat transfer area using equation (8):

$$Q = q(0) W_0 \Delta x \tag{8}$$

Method 400 proceeds to step 510 of FIG. 5.

FIG. 5 is a flowchart illustrating a second part of method 400. The second part of method 400 comprises steps 510 through 550.

At step 510, method 400 increments the current position along the channel by adding the incremental distance $\Delta x$ to the previous position.

At step 520, if the current position along the channel exceeds channel length L, then method 400 proceeds to step 530. At step 530, width profile W(x) is output to a storage or display device suitable for serving as input to the configuration of a thermally compensated channel in a fuel cell flow plate. Method 400 proceeds to step 540 and ends.

At step 520, if the current position along the channel does not exceed channel length L, then method 400 proceeds to step 550. At step 550, method 400 estimates the temperature $T_i$ of the working fluid at the current position $x_i$ along the channel using equation (9):

$$T_i = \frac{Q_{i-1}}{\dot{m} C_{pi-1}} + T_{i-1} \tag{9}$$

where $Q_{i-1}$ is the heat transfer across the heat transfer area at the previous position $x_{i-1}$ along the channel, ṁ is the mass flow rate, $C_{pi-1}$ is the specific heat at position $x_{i-1}$ and $T_{i-1}$ is the temperature of the working fluid at position $x_{i-1}$.

At step 560, method 400 solves for substantially constant heat flux by adjusting channel width W(x). In other words, method 400 finds channel width W(x) for which the absolute difference in heat flux between $q(x_i)$ and $q(x_{i-1})$ is below a predetermined threshold. Alternatively, method 400 can be used to tailor a specific heat flux gradient or profile (for example so that the temperature difference across a fuel cell can be controlled). The solver uses equations (10) through (16):

$$h_i = \frac{k_{thi} Nu_i}{d_{hi}} \tag{10}$$

$$Nu_i = 1.86 \left( PrRe \frac{d_{hi}}{L} \right)^{\frac{1}{3}} \left( \frac{\mu_i}{\mu_w} \right)^{0.14} \tag{11}$$

$$Pr_i = \frac{C_{pi} \mu_i}{k_{thi}} \tag{12}$$

$$Re_i = \frac{\rho_i v_i d_{hi}}{\mu_i} \tag{13}$$

$$d_{hi} = \frac{4 W_i D_0}{2(W_i + D_0)} \tag{14}$$

$$v_i = \frac{\dot{m}}{\rho_i W_i D_0} \tag{15}$$

$$q(x_i) = h_i(T_w - T_i) \tag{16}$$

A suitable numerical solver can be used such as a Generalized Reduced Gradient algorithm for solving non-linear problems.

When the numerical solver has converged to a solution for channel width $W(x_i)$, method 400 proceeds to step 570. At step 570, channel width $W(x_i)$ is stored in a channel width profile record.

At step 580, method 400 estimates the heat transfer across the current heat transfer area $W(x_i) \Delta x$ using equation (17):

$$Q_i = q(x_i) W_i \Delta x \tag{17}$$

Method 400 then returns to step 510.

Method 400 describes the method for configuring a thermally compensated channel for a channel having a rectangular cross-section with a varying width and a substantially constant depth along its length. In other embodiments, a thermally compensated channel can have a rectangular cross-section with a varying or constant width and a varying depth. In some embodiments, a thermally compensated channel can have a cross-section that is not rectangular or substantially rectangular, but has some other cross-sectional channel shape. A thermally compensated channel can be configured by a suitable adjustment of the velocity of the working fluid in the channel through the appropriate alteration in the channel's cross-sectional area.

Figure 6:
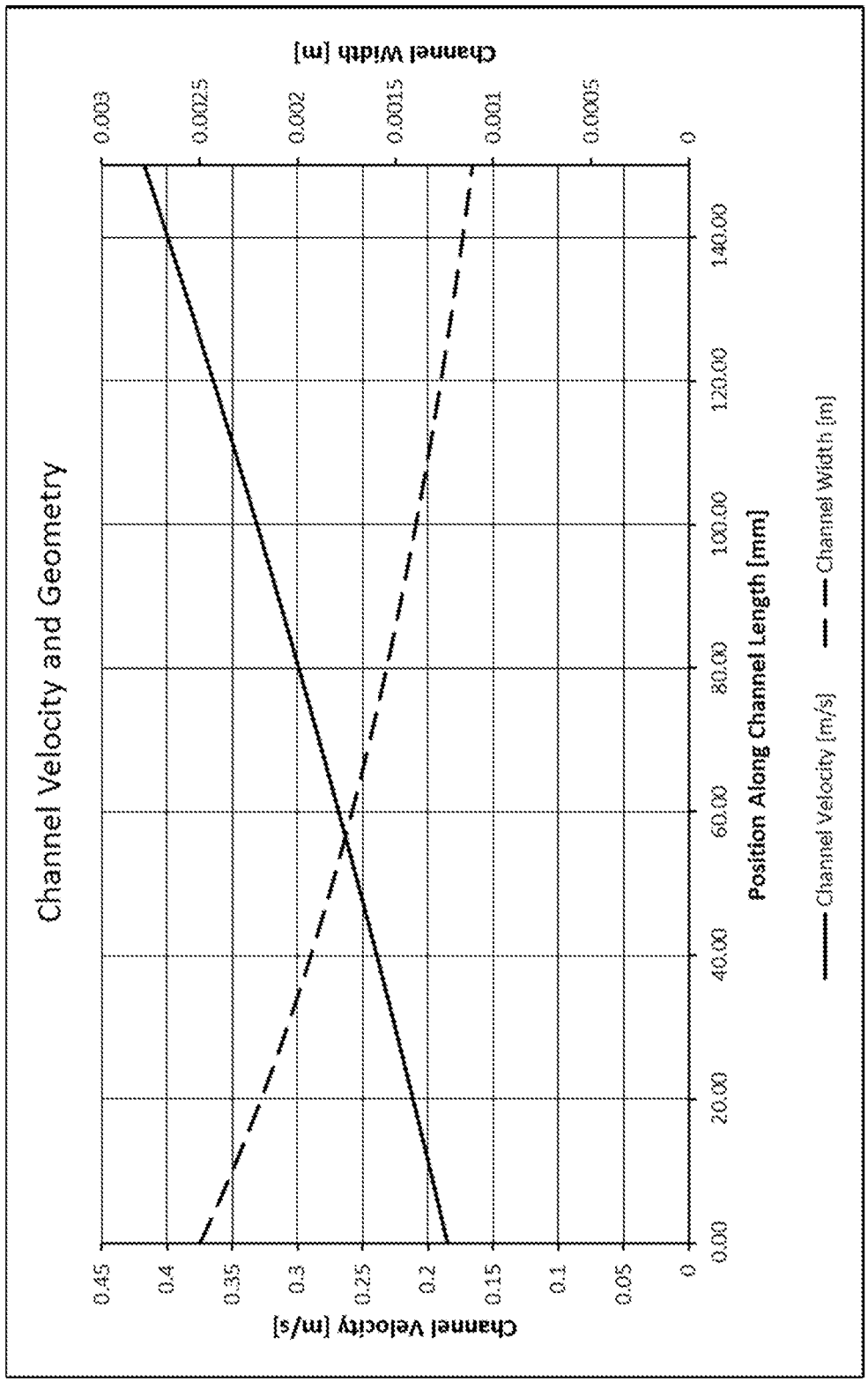
FIG. 6 is a graph illustrating channel width and working fluid velocity along a thermally compensated rectangular channel configured according to the method of FIGS. 4 and 5.

FIG. 6 is a graph illustrating channel width and working fluid velocity along a thermally compensated channel with rectangular cross-section configured according to method 400 of FIGS. 4 and 5.

The channel width decreases from 2.5 mm at the inlet to approximately 1.1 mm at the outlet. The decreasing channel width is associated with a corresponding increase in velocity of the working fluid along the channel length. The velocity increases from approximately 0.185 m/s at the inlet to 0.418 m/s at the outlet.

Figure 7:
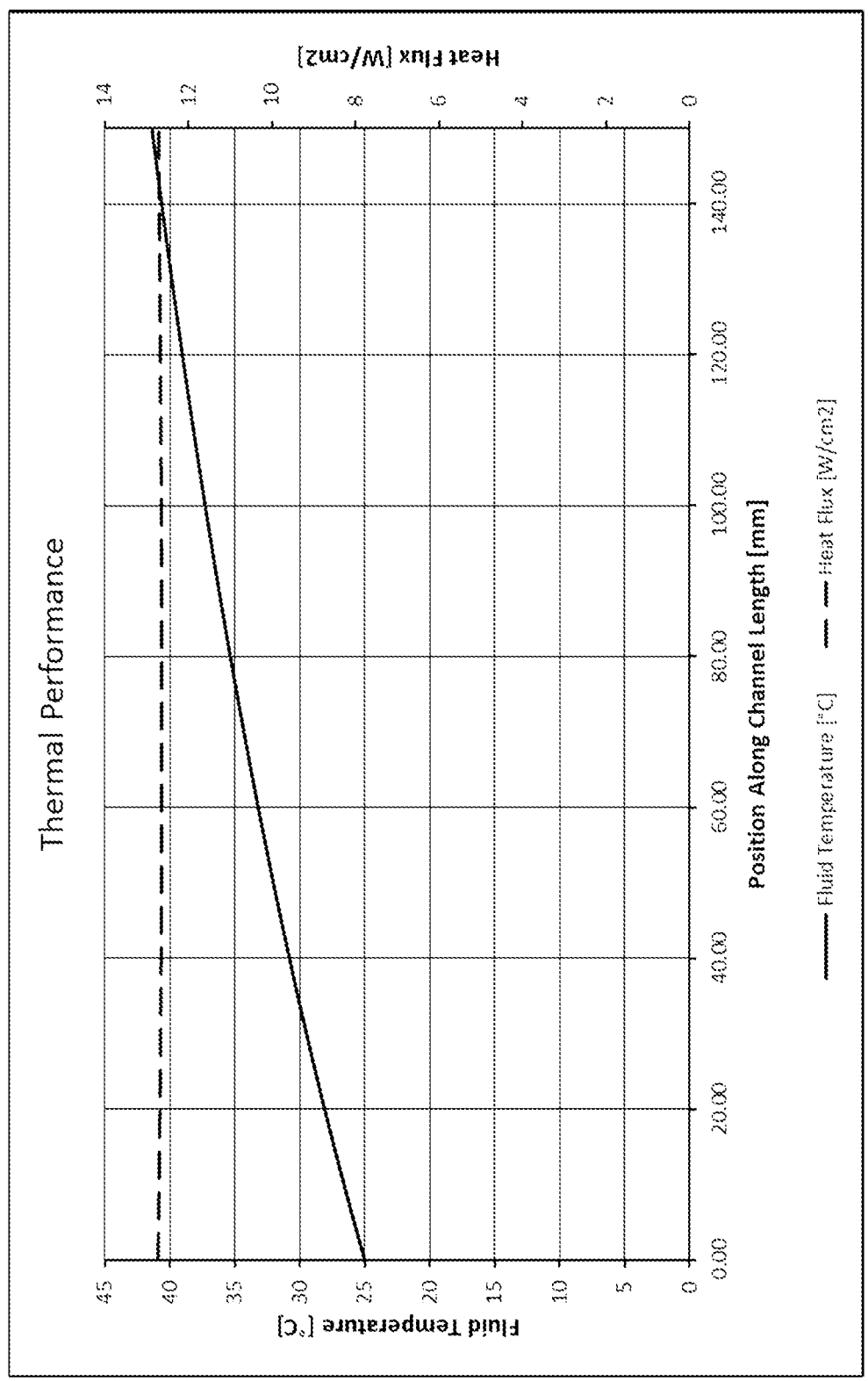
FIG. 7 is a graph illustrating the heat flux and temperature of the working fluid along a thermally compensated rectangular channel configured according to the method of FIGS. 4 and 5.

FIG. 7 is a graph illustrating the heat flux and temperature of the working fluid along a thermally compensated rectangular channel configured according to method 400 of FIGS. 4 and 5.

The heat flux is held essentially constant. In the example shown, the heat flux is approximately 12.7 W/cm$^2$. The temperature of the working fluid increases along the channel from 25° C. at the inlet to approximately 41.3° C. at the outlet.

Figure 8:
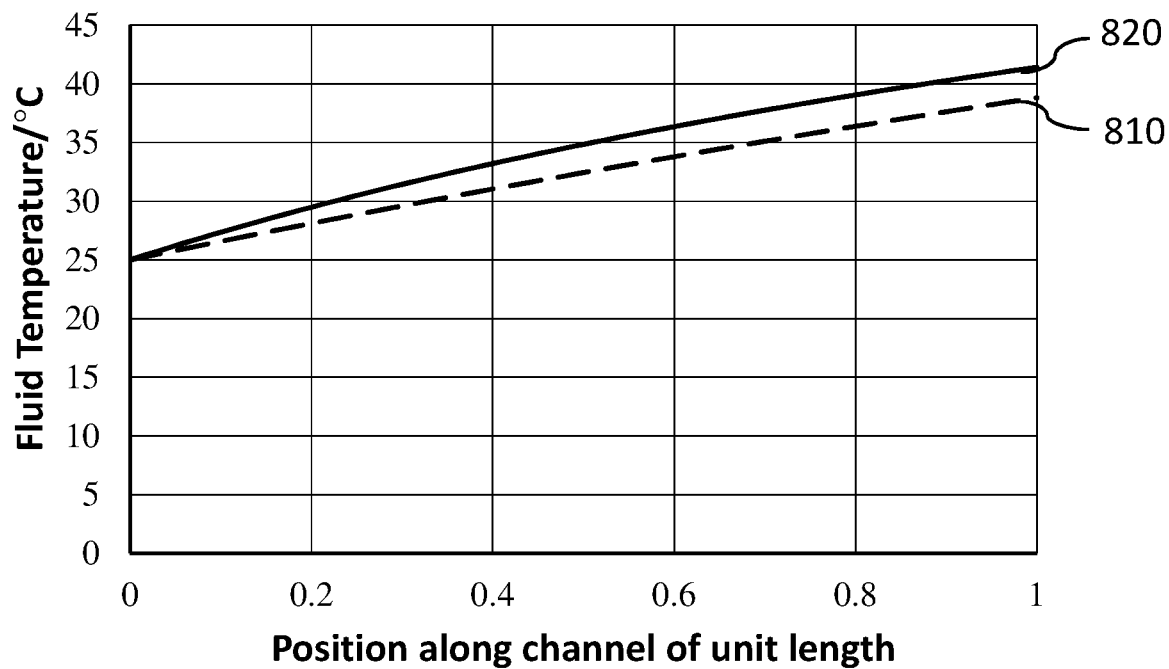
FIG. 8 is a graph illustrating the temperature of the working fluid along the length of a channel for conventional and thermally compensated channels.

FIG. 8 is a graph illustrating the temperature of the working fluid along the length of a channel for a conventional channel and for a thermally compensated channel. Line 810 shows the variation in temperature of the working fluid along the length of a conventional channel. In this example, the conventional channel has a rectangular cross-section and constant width, depth and cross-sectional area along its length. Line 820 shows the variation in temperature of the working fluid along the length of a thermally compensated channel such as the one illustrated in FIGS. 6 and 7.

FIG. 8 shows that more heat is removed from the fuel cell by a configuration comprising thermally compensated channels since the temperature of the working fluid at the outlet is higher than it is for the conventional channel, even though the inlet temperature at each inlet is the same.

Figure 9:
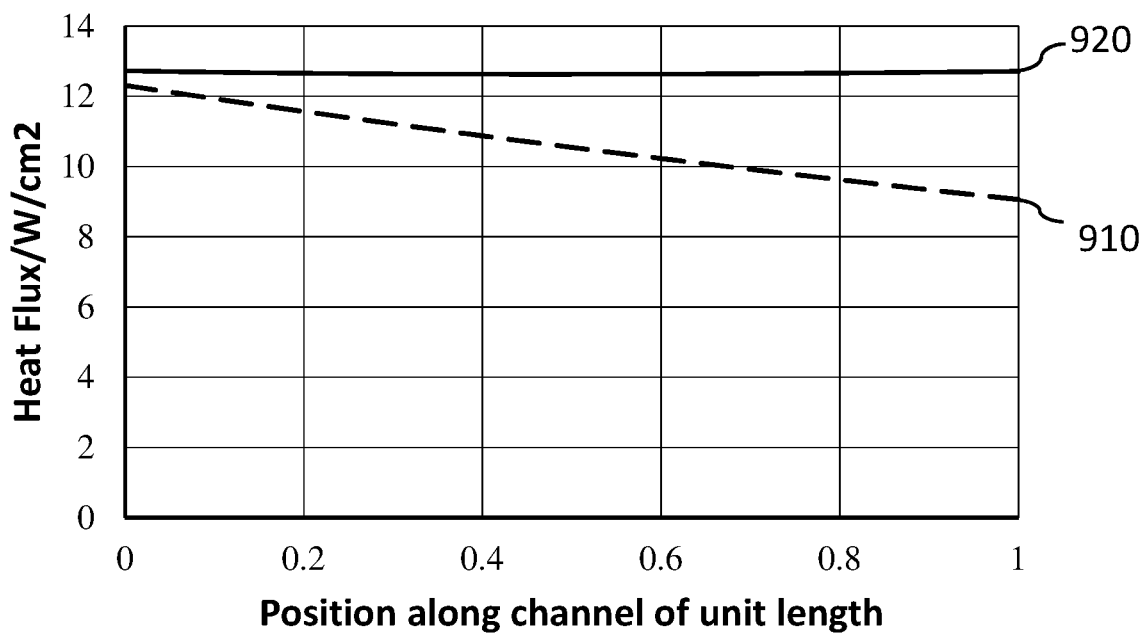
FIG. 9 is a graph that shows that the heat flux is essentially constant along the length of the thermally compensated channel from the inlet to the outlet.

FIG. 9 is a graph illustrating the heat flux along the length of a channel for a conventional channel and a thermally compensated channel. Line 910 shows the heat flux along the length of a conventional channel. In this example, the conventional channel has a rectangular cross-section and constant width, depth and cross-sectional area along its length. Line 920 shows the heat flux along the length of a thermally compensated channel such as the one illustrated in FIGS. 6 and 7.

FIG. 9 shows that the heat flux can be essentially constant along the length of the thermally compensated channel from the inlet to the outlet. Since the thermally compensated channel is configured to keep the heat flux essentially constant along the length of the channel, heat is removed more uniformly and isothermal operation is possible.

Figure 10:
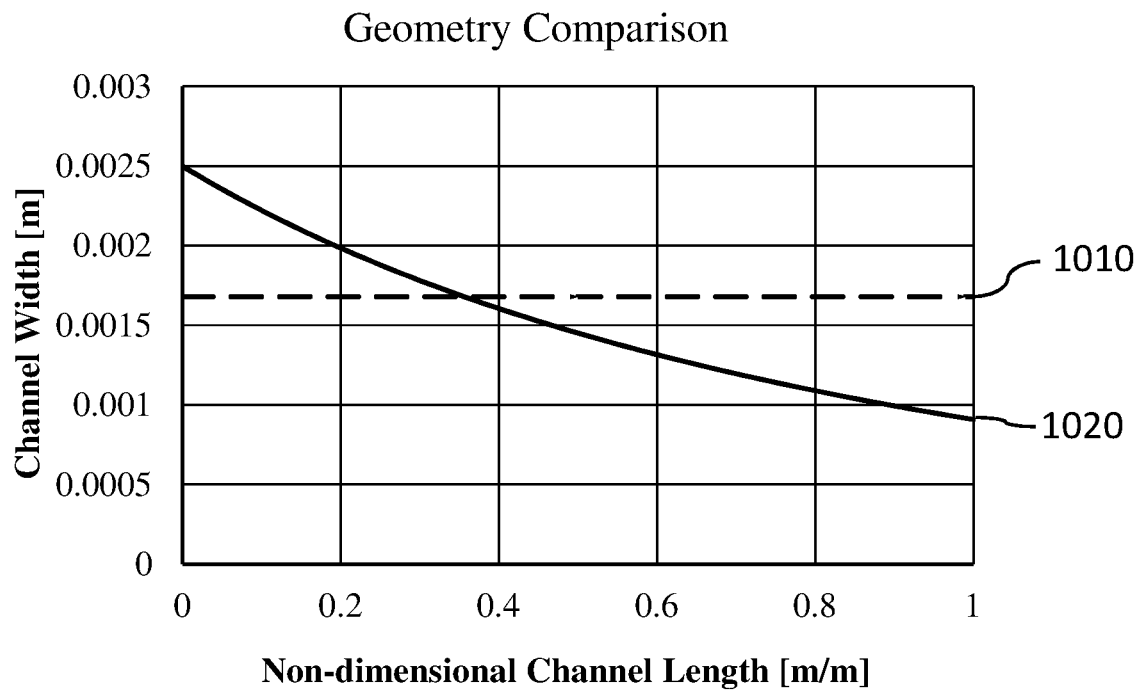
FIG. 10 is a graph of channel width as a function of normalized distance along the channel from inlet to outlet for conventional and thermally compensated channels.

FIG. 10 is a graph of the channel width as a function of normalized distance along the channel from inlet to outlet for a conventional channel and a thermally compensated channel. Line 1010 shows the channel width of a conventional channel having essentially constant channel width. Line 1020 shows the channel width of a thermally compensated channel, such as the one illustrated in FIGS. 6 and 7.

Figure 11:
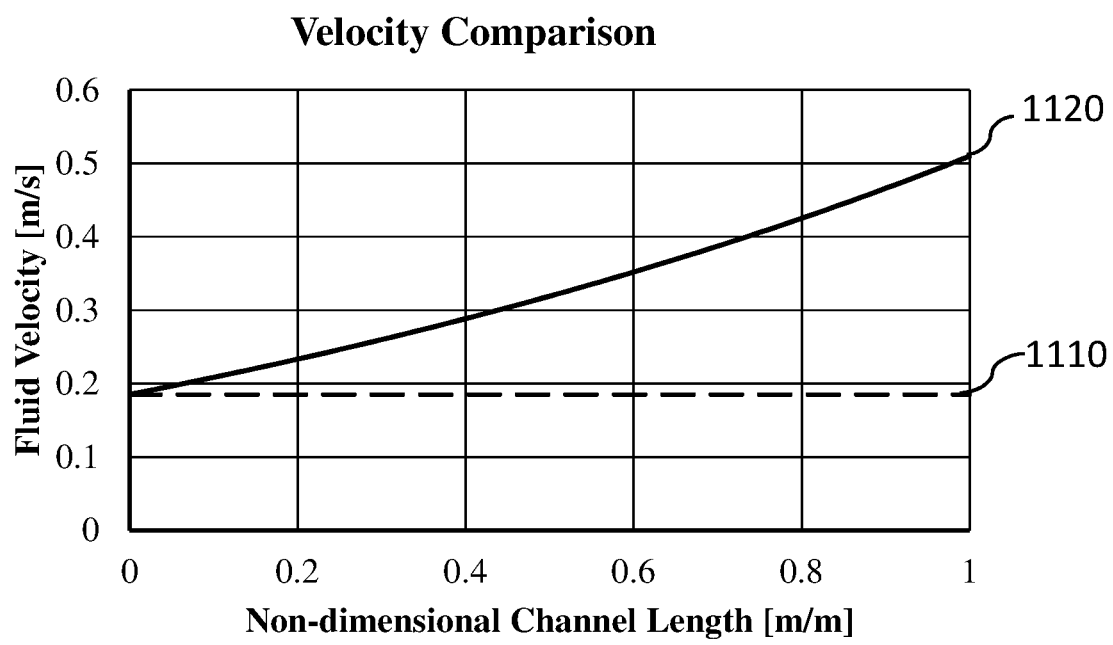
FIG. 11 is a graph of the velocity of working fluid as a function of normalized distance along the channel from inlet to outlet for conventional and thermally compensated channels.

FIG. 11 is a graph of the velocity of working fluid as a function of normalized distance along the channel from inlet to outlet for a conventional channel and a thermally compensated channel. Line 1110 shows the velocity of working fluid along the length of a conventional channel having substantially constant channel width, depth and cross-sectional area along its length. Line 1120 shows the velocity of working fluid along the length of a thermally compensated channel such as the one illustrated in FIGS. 6 and 7.

The method described above is one approach to configuring a thermally compensated channel. Other suitable methods for adjusting the dimensions of the channel, the velocity of the working fluid and/or the local heat transfer area can be used to configure a channel to substantially compensate for the increase in the temperature of the working fluid along the length of the channel or, in other words, to compensate for the decrease in the temperature difference between the working fluid and the heat transfer surface along the length of the channel.

An experiment was conducted in order to validate the method described above for configuring a thermally compensated channel. The experiment compared the behavior of a conventional channel to the behavior of a thermally compensated channel.

Figure 12:
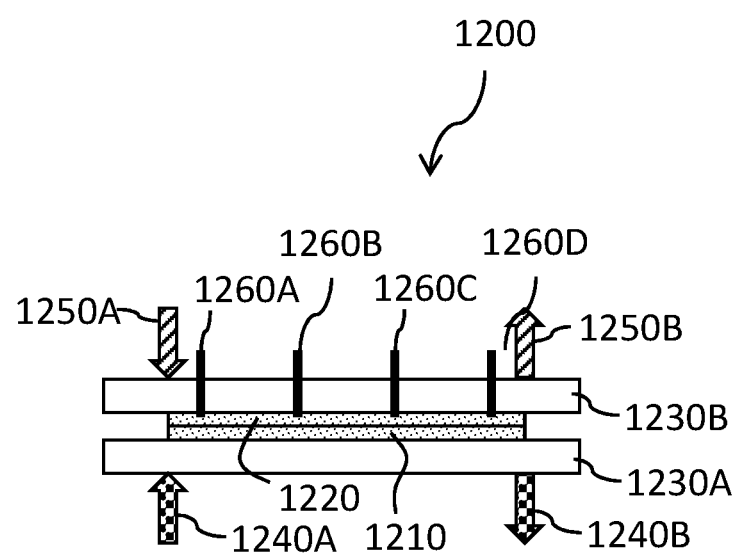
FIG. 12 is a schematic of an apparatus used to verify the method of FIGS. 4 and 5 for configuring a thermally compensated channel.

FIG. 12 is a schematic of apparatus 1200 used to verify the method of FIGS. 4 and 5 for configuring a thermally compensated channel. Apparatus 1200 comprises simulated reactant flow field plate 1210, coolant flow field plate 1220, clamping plates 1230A and 1230B, inlet and outlet ports 1240A and 1240B for hot fluid, inlet and outlet ports 1250A and 1250B for cold fluid, and one or more thermocouples 1260A through 1260D.

Simulated reactant flow field plate 1210 was maintained at an essentially constant temperature to simulate a fuel cell operating at uniform current density. Coolant flow field plate 1220 comprises an arrangement of channels. In a first embodiment, the channels are conventional channels arranged in a serpentine pattern. In a second embodiment, the channels are thermally compensated channels and configured to produce uniform heat flux across the heat transfer area. Thermocouples 1260A through 1260D were used to measure the temperature of fluid flowing across coolant flow field plate 1220.

Simulated reactant flow field plate 1210 is situated on the hot side of the heat exchanger. Fluid in flow field plate 1210 has a mass flow rate of $\dot{m}_i$ and the temperature of the fluid at inlet and outlet ports 1240A and 1240B is $T_{hi}$ and $T_{ho}$ respectively.

Coolant flow field plate 1220 is situated on the cool side of the heat exchanger. Fluid in controlled flow field plate 1220 has a mass flow rate of and the temperature of the fluid at inlet and outlet ports 1250A and 1250B is $T_{ci}$ and $T_{co}$ respectively.

Simulated reactant flow field plate 1210 and coolant flow field plate 1220 cover an equivalent active area. The working fluid was deionized water. To avoid temperature gradients on the hot side of the heat exchanger, the deionized water was pumped across plate 1210 at significantly higher flow rates on the hot side relative to the cold side.

A first test was conducted using the first embodiment of coolant flow field plate 1220 (serpentine channels). Table 1 lists the parameters for the first test.

TABLE 1

| Parameter | Serpentine Channels |
| --- | --- |
| $T_{ci}$ [° C.] | 23 |
| $T_{co}$ [° C.] | 60 |
| $T_{hi}$ [° C.] | 68 |
| $T_{ho}$ [° C.] | 64 |
| Channel Length [m] | 2.1 |
| $W_0$ [m] | 0.0016 |
| $D_0$ [m] | 0.00400 |
| $\dot{m}_c$ [kg/s] | 0.00067 |
| $\dot{m}_h$ [kg/s] | 0.033 |

Figure 13:
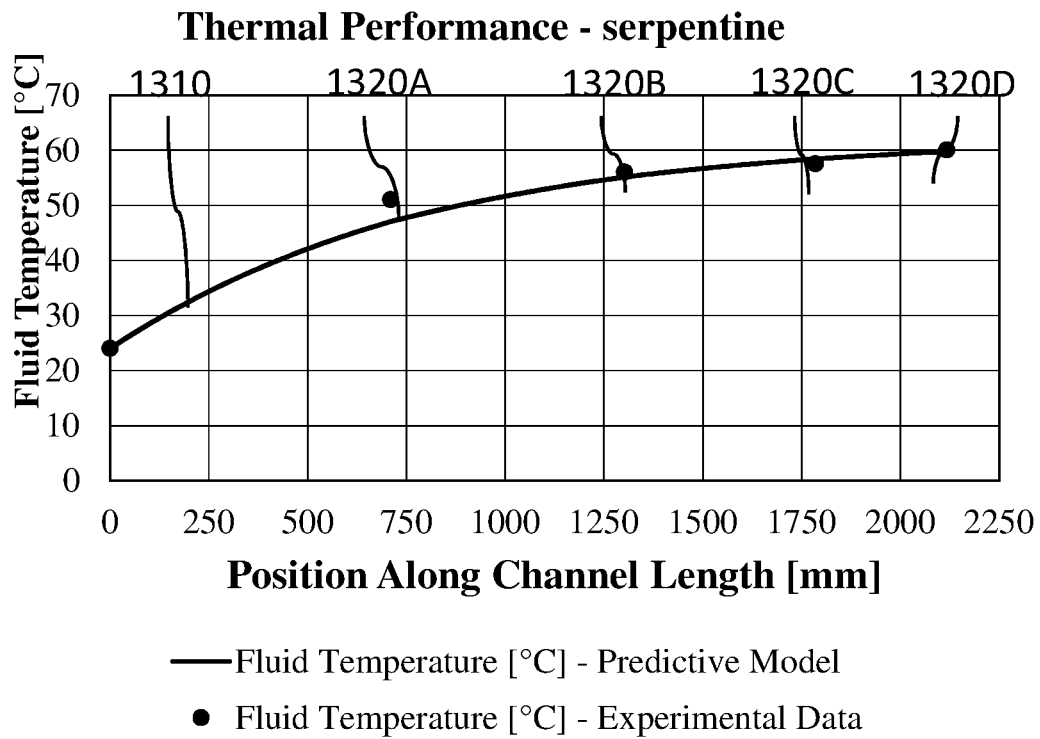
FIG. 13 is a graph of the test results and the expected temperature profile, based on the thermal model, for conventional serpentine channels.

FIG. 13 is a graph displaying the test results and the expected temperature profile for serpentine channels. FIG. 13 shows there is good agreement between the expected temperature profile 1310 (calculated using a model) and data points 1320A through 1320D measured by thermocouples 1260A through 1260D respectively of FIG. 12. The root mean square error is less than 2° C.

A second test was conducted using the second embodiment of coolant flow field plate 1220 (thermally compensated channels). Table 2 lists the parameters for the second test.

There are a variety of suitable configurations of the channel geometry that can be used to compensate at least partially for the increase in temperature of the working fluid along the length of the channel. For the purposes of the second test, the channel was configured to have a substantially rectangular cross-section, a constant depth, and a channel width configured to follow an exponential function with respect to the position along the channel length, and a y-intercept of 0.0025 and a base of 0.00278.

TABLE 2

| Parameter | Thermally Compensated Channels |
|---|---|
| $T_{ci}$ [° C.] | 24 |
| $T_{co}$ [° C.] | 45 |
| $T_{hi}$ [° C.] | 68 |
| $T_{ho}$ [° C.] | 60 |
| Channel Length [m] | .1505 |
| $W_0$ [m] | 0.0025 |
| $D_0$ [m] | 0.00300 |
| $\dot{m}_c$ [kg/s] | 0.0050 |
| $\dot{m}_h$ [kg/s] | 0.033 |

Figure 14:
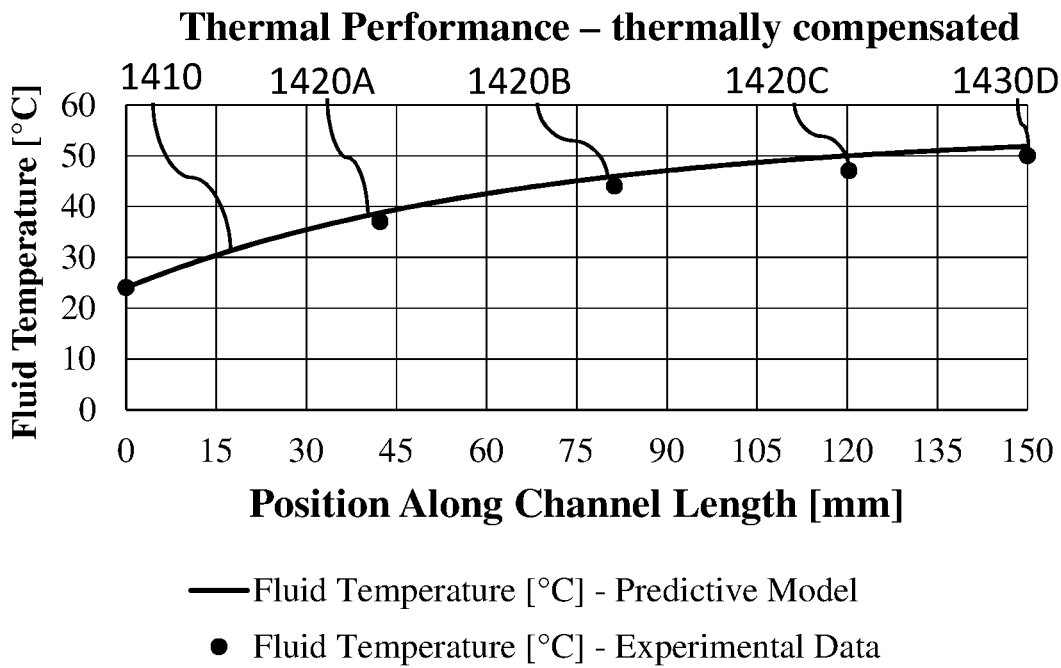
FIG. 14 is a graph of the test results and the expected temperature profile, based on the thermal model, for thermally compensated channels.

FIG. 14 is a graph of the test results and the expected temperature profile for thermally compensated channels. FIG. 14 shows there is good agreement between the expected temperature profile 1410 (calculated using a model) and data points 1420A through 1420D measured by thermocouples 1260A through 1260D respectively of FIG. 12. The root mean square error is less than 2° C.

In some embodiments, a fuel cell flow field plate comprises at least one cooling channel with a cross-sectional area or width that decreases from inlet to outlet. In some embodiments, the cross-sectional area or width of the cooling channel decreases continuously from inlet to outlet.

In some embodiments, a fuel cell flow field plate comprises at least one channel for convective cooling, the channel comprising a first region in which the channel has a substantially constant cross-sectional area or width, and a second region in which the channel has a diminishing cross-sectional area or width. The first region may facilitate the distribution of a working fluid from an inlet port to the fuel cell flow field plate. The second region may facilitate the distribution of the working fluid across the fuel cell flow field plate from the first region to an outlet port.

In some embodiments, a fuel cell flow field plate comprises at least one channel for convective cooling, the channel comprising a first region in which the channel has a substantially constant cross-sectional area or width, a second region following the first region in which the channel has a diminishing cross-sectional area or width, and a third region following the second region in which the channel has a substantially constant cross-sectional area or width.

Embodiments of the apparatus and method described above can be used to configure thermally compensated coolant channels for fuel cells having conventional cathode and anode flow field designs such as cathode and anode flow field designs and operating with non-uniform current density.

Embodiments of the apparatus and method described above can be used to configure thermally compensated coolant channels that are particularly suitable for use in fuel cells operating with substantially uniform current density; for example, having unconventional reactant flow field channels on the anode and/or the cathode.

Fuel cell cathode and anode flow channels having a cross-sectional area that varies along the channel length in various manners are described in Applicant's U.S. Pat. No. 7,838,169, which is herein incorporated by reference in its entirety, and in Applicant's U.S. Patent Application Publication No. US2015/0180052 which is also herein incorporated by reference in its entirety. Under certain operating conditions, fuel cells with reactant channel profiles as described in these documents can be operated with substantially uniform current density, and also at extremely high current densities where thermal management can be challenging. In these situations, it can be particularly desirable to configure the fuel cell coolant channels to be able to provide substantially uniform heat flux across the fuel cell active area when a suitable coolant is directed through them. For example, this approach can be used for fuel cells in motive applications, operating at high current densities in the range of about 1 A/cm$^2$ to about 2 A/cm$^2$, or about 1 A/cm$^2$ to about 3 A/cm$^2$, and in some cases at operating at current densities exceeding 3 A/cm$^2$.

Thus, aspects of the apparatus and methods described herein relate to fuel cell assemblies comprising thermally compensated coolant channels in combination with oxidant and/or fuel reactant channels having special profiles (such as described in U.S. Pat. No. 7,838,169 and U.S. Patent Application Publication No. US2015/0180052), and methods for operating such fuel cell assemblies, for example, to provide substantially uniform current density and substantially uniform heat flux between the fuel cell and the coolant across the fuel cell active area. This can allow a substantially uniform plate temperature, or substantially isothermal conditions, to be maintained across the fuel cell active area during operation of the fuel cell. This can in turn aid in maintaining on-going uniformity of current density.

In some embodiments, a fuel cell comprises:
  an anode;
  a cathode;
  a proton exchange membrane electrolyte interposed between the anode and the cathode;
  an anode flow field plate adjacent the anode, the anode flow field plate comprising at least one anode flow channel for directing fuel to the anode;
  a cathode flow field plate adjacent the cathode, the cathode flow field plate comprising at least one cathode flow channel for directing oxidant to the cathode; and
  at least one thermally compensated coolant channel between the cathode flow field plate and the anode flow field plate, for directing a coolant in contact with at least one of the flow field plates.

The thermally compensated coolant channel has a cross-sectional area that decreases in the coolant flow direction along at least a portion of the channel length. In some embodiments, the channel is substantially rectangular in cross-section and the width of the channel decreases non-linearly while the depth remains substantially constant.

In some embodiments, the cross-sectional area of the at least one cathode flow channel decreases in the oxidant flow direction along at least a portion of the channel length and/or the cross-sectional area of the at least one anode flow channel decreases in the fuel flow direction along at least a portion of the channel length. In some embodiments, the cross-sectional area of the at least one cathode flow channel and/or the at least one anode flow channel decreases in accordance with an exponential function. In such embodiments in which the cross-sectional area of the anode or cathode flow channels decreases in the reactant flow direction along at least a portion of the length of the respective channel, the characteristics of these reactant flow channels can vary continuously and smoothly as a function of distance along the channel, or can vary in stepwise, discrete or discontinuous manner, such as described in co-owned U.S. Patent Application Publication No. US2015/0180052, for example.

Similarly, in some embodiments of a thermally compensated coolant channel, characteristics of the coolant channel (such as cross-sectional area or width) or the velocity of the working fluid, for example, vary continuously or smoothly as a function of distance along the channel. In other embodiments, characteristics of a thermally compensated coolant channel vary as a function of distance along the channel in a stepwise, discrete or discontinuous manner, for example, to approximately compensate for the increase in the temperature of the working fluid along the length of the channel. For example, performance benefits can be obtained by using thermally compensated coolant channels that incorporate discrete variations, such as for example, a step-wise decrease in cross-sectional area along at least a portion of the channel, or a cross-sectional area that decreases in accordance with a piecewise linear function along at least a portion of the channel length. In some embodiments, thermally compensated coolant channels can contain discrete features that reduce the effective cross-sectional area and obstruct coolant flow, where the density and/or size of those features increases in the coolant flow direction to decrease the cross-sectional area and/or increase the flow velocity on average in the flow direction along the channel. Examples of such features are ribs, tapered ribs or pillars.

The fuel cell reactant flow field plates and coolant flow field plates can be made from a suitable electrically conductive material, including graphite, carbon, composite materials and various metals. Depending on the plate material, the channels can be formed by milling, molding, stamping, embossing or corrugating, for example. The coolant channels can be formed in separate coolant flow field plates, or can be formed in the anode and/or cathode reactant flow field plates on the opposite surface from the reactant channels.

In some embodiments of the fuel cell assemblies, the reactant flow field plates are stamped, embossed or corrugated so that channels are formed on both sides. Such plates can be stacked or nested so that coolant channels are formed between the cooperating surfaces of the anode and cathode flow field plates. If the anode and cathode flow field channels have a cross-sectional area that varies along the channel length, the corresponding channel on the opposite face of each plate will also have a cross-sectional area that varies along the channel length.

Figure 15A:
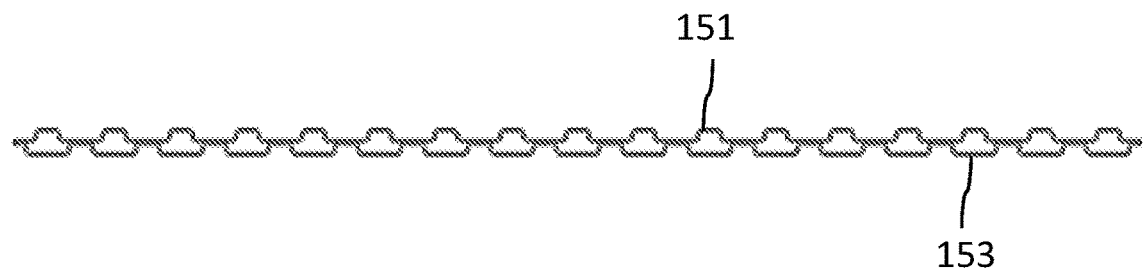
FIGS. 15A-C illustrate an example embodiment of a pair of corrugated, trapezoidal reactant flow field plates that are stacked so that coolant channels having a cross-sectional area that varies along their length are formed between the cooperating corrugated surfaces of the stacked plates.
Figure 15B:
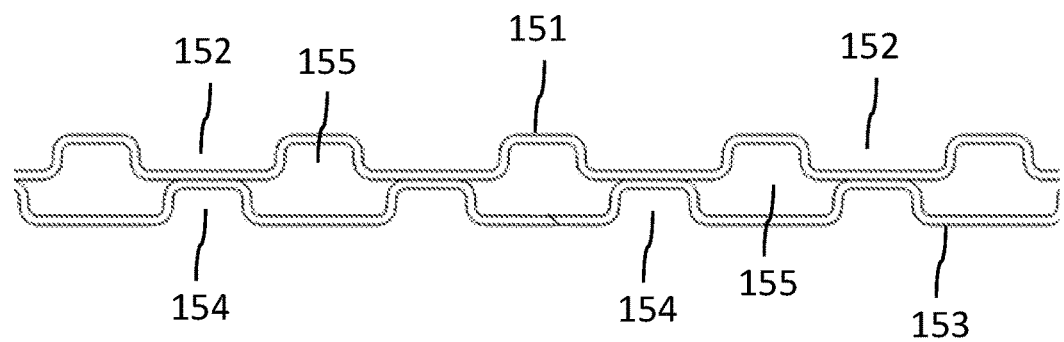
Figure 15C:
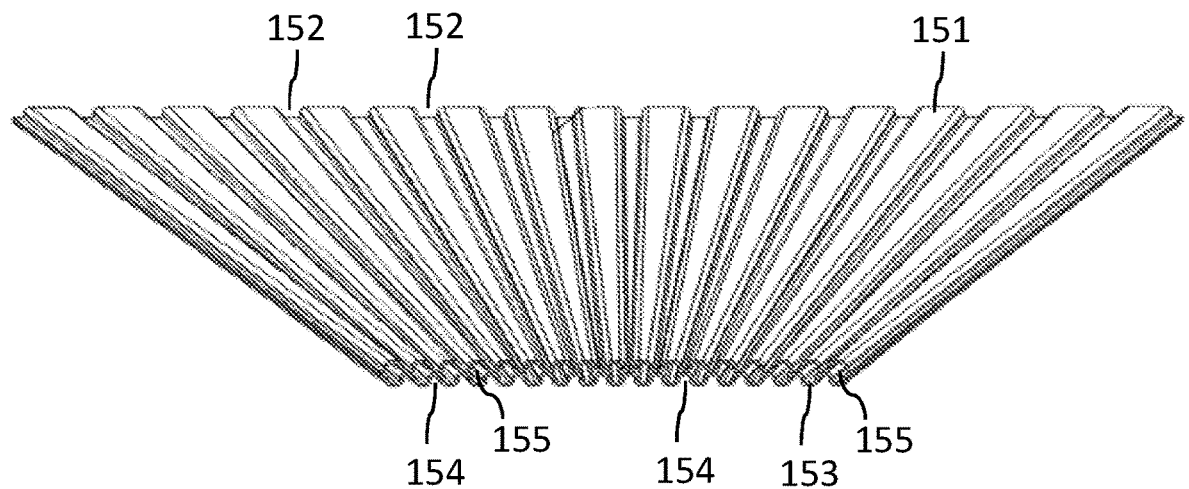

For example, FIGS. 15A-C show a pair of corrugated, trapezoidal reactant flow field plates, 151 and 153, that are stacked one on top of the other. FIG. 15A shows a cross-sectional view of anode plate 151 on top of cathode plate 153. FIG. 15B shows an enlarged view of a portion of FIG. 15A, with fuel flow channels 152 on the upper surface of anode plate 151, and oxidant flow channels 154 on the lower surface of cathode plate 153. Coolant channels 155 are formed between the cooperating corrugated surfaces of the pair of stacked plates 151 and 153. FIG. 15C is an isometric view of corrugated, trapezoidal reactant flow field plates 151 and 153 stacked to define coolant channels 155 between their cooperating surfaces. The cross-sectional area of the fuel, oxidant and coolant channels, 152, 154 and 155, respectively, varies along their length.

Figure 16A:
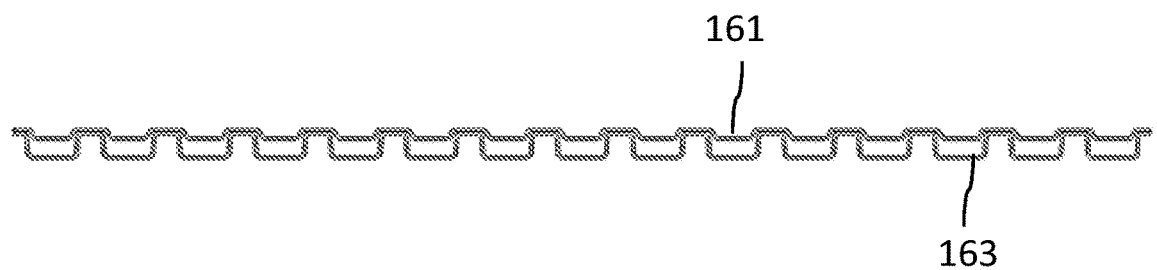
FIGS. 16A-C illustrate an example embodiment of a pair of corrugated, trapezoidal reactant flow field plates that are nested so that coolant channels having a cross-sectional area that varies along their length are formed between the cooperating corrugated surfaces of the nested plates.
Figure 16B:
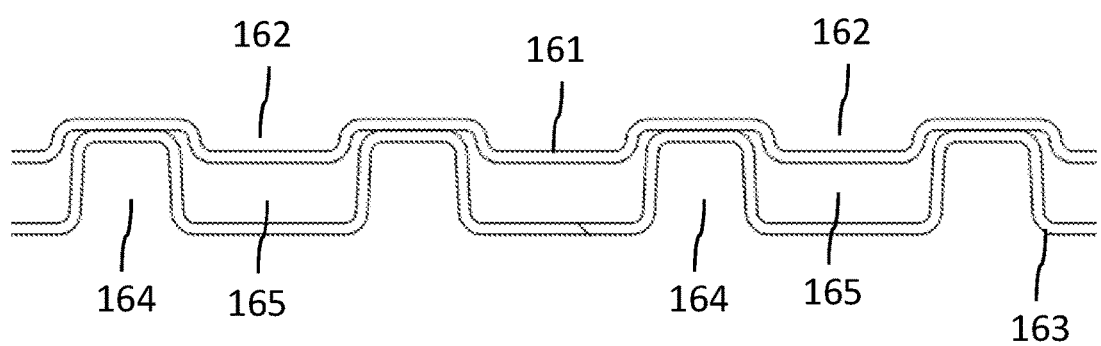
Figure 16C:
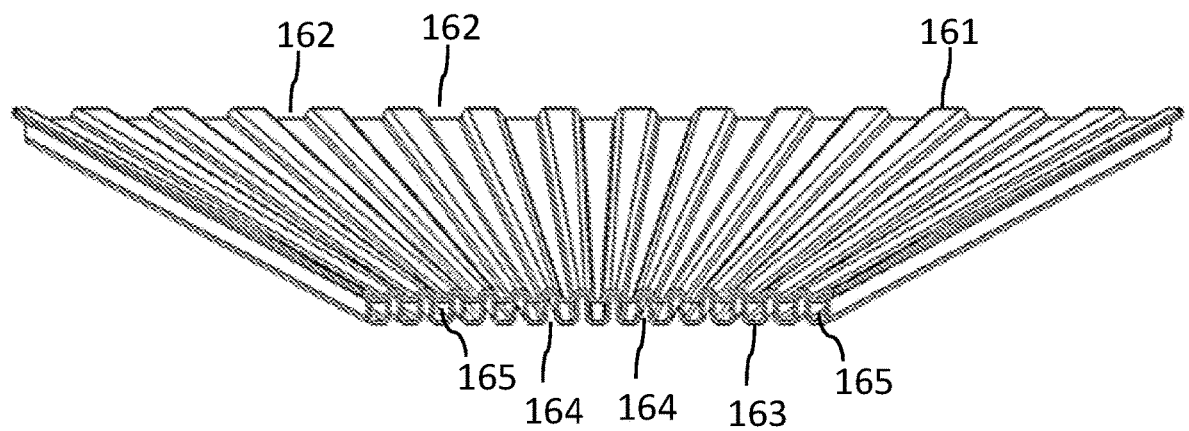

FIGS. 16A-C show a pair of corrugated, trapezoidal reactant flow field plates, 161 and 163, that are nested together. FIG. 16A shows a cross-sectional view of anode plate 161 on top of cathode plate 163. FIG. 16B shows an enlarged view of a portion of FIG. 16A, with fuel flow channels 162 on the upper surface of anode plate 161, and oxidant flow channels 164 on the lower surface of cathode plate 163. Coolant channels 165 are formed between the cooperating corrugated surfaces of the pair of nested plates 161 and 163. FIG. 16C is an isometric view of corrugated, trapezoidal reactant flow field plates 161 and 163 nested to define coolant channels 165 between their cooperating surfaces. The cross-sectional area of the fuel, oxidant and coolant channels, 162, 164 and 165, respectively, varies along their length.

Figure 17A:
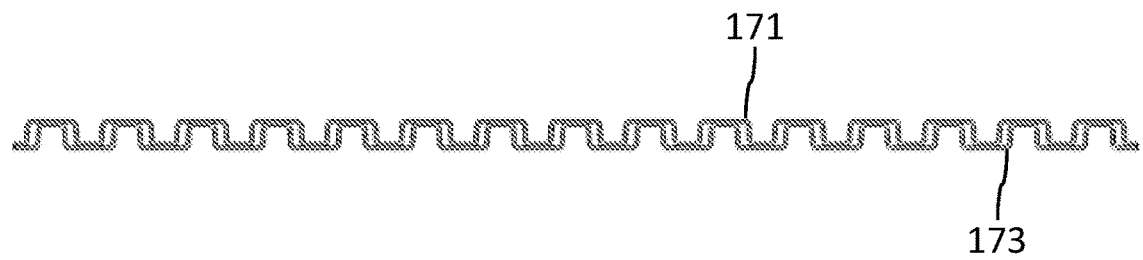
FIGS. 17A-C illustrate another example embodiment of a pair of corrugated, trapezoidal reactant flow field plates that are nested so that coolant channels having a cross-sectional area that varies along their length are formed between the cooperating corrugated surfaces of the nested plates.
Figure 17B:
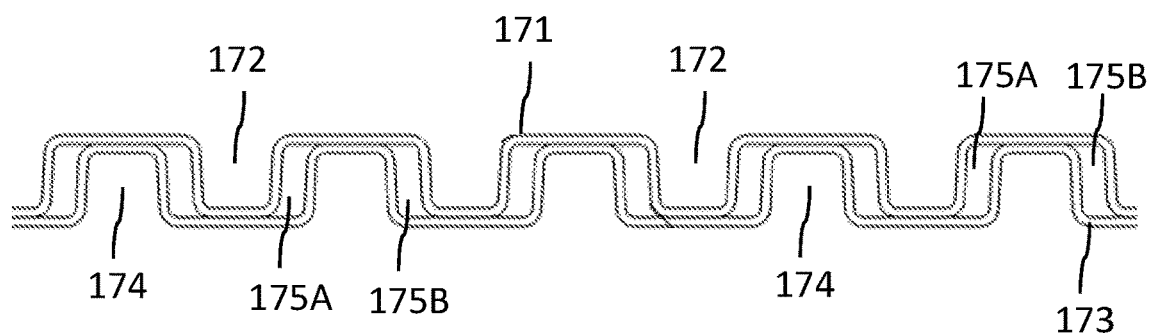
Figure 17C:
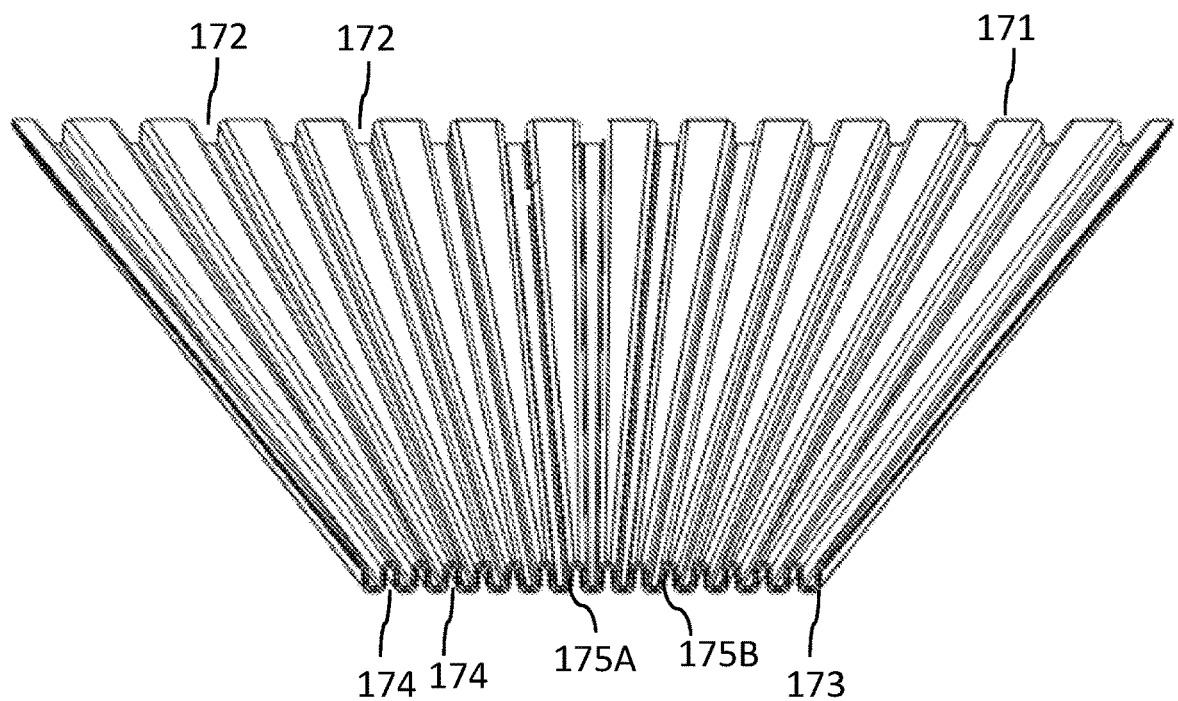

FIGS. 17A-C show a pair of corrugated, trapezoidal reactant flow field plates, 171 and 173, that are also nested together. FIG. 17A shows a cross-sectional view of anode plate 171 on top of cathode plate 173. FIG. 17B shows an enlarged view of a portion of FIG. 17A, with fuel flow channels 172 on the upper surface of anode plate 171, and oxidant flow channels 174 on the lower surface of cathode plate 173. A pair of coolant channels, 175A and 175B, is formed by the cooperating corrugated surfaces for each channel of the nested plates 171 and 173. FIG. 17C is an isometric view of corrugated, trapezoidal reactant flow field plates 171 and 173 nested to define pairs of coolant channels, 175A and 175B, between their cooperating surfaces. The cross-sectional area of the fuel, oxidant and coolant channels, 172, 174, 175A and 175B, respectively, varies along their length.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A fuel cell plate assembly comprising:
   (a) a first reactant flow field plate comprising:
      (i) a first major surface;
      (ii) a second major surface;
      (iii) a plurality of first reactant channels on said first major surface for directing a first reactant across said first reactant flow field plate in a first reactant flow direction;
   wherein said first major surface and said second major surface are oppositely facing major surfaces,
   (b) a second reactant flow field plate comprising
      (i) a third major surface;
      (ii) a fourth major surface;
      (iii) a plurality of second reactant channels on said third major surface for directing a second reactant across said second reactant flow field plate in a second reactant flow direction;
   wherein said third major surface and said fourth major surface are oppositely facing major surfaces,
   wherein:
   said first reactant flow field plate further comprises a first plurality of secondary channels on said second major surface and/or said second reactant flow field plate further comprises a second plurality of secondary channels on said fourth major surface,
   said second reactant flow field plate and said first reactant flow field plate are stacked so that said second major surface cooperates with said fourth major surface to define a plurality of coolant channels between said first reactant flow field plate and said second reactant flow field plate for directing a coolant in a coolant flow direction, said plurality of first reactant channels decrease in cross-sectional area along at least a portion of their length in said first reactant flow direction, and said plurality of coolant channels decrease in cross-sectional area along at least a portion of their length in said coolant flow direction_.

2. The fuel cell plate assembly of claim 1 wherein said first reactant flow direction and said coolant flow direction are substantially aligned.

3. The fuel cell plate assembly of claim 1 wherein said first reactant flow field plate is a cathode flow field plate, said plurality of first reactant channels is a plurality of cathode channels, said first reactant is an oxidant, said first reactant flow direction is an oxidant flow direction, said second reactant flow field plate is an anode flow field plate, said plurality of second reactant channels is a plurality of anode channels, said second reactant is a fuel, and said second reactant flow direction is a fuel flow direction.

4. The fuel cell plate assembly of claim 3 wherein said plurality of anode channels decrease in cross-sectional area along at least a portion of their length in said fuel flow direction, and said oxidant flow direction and said fuel flow direction are substantially aligned.

5. The fuel cell plate assembly of claim 4 wherein:
said plurality of cathode channels decrease in width along at least a portion of their length in said oxidant flow direction,
said plurality of coolant channels decrease in width along at least a portion of their length in said coolant flow direction,
said plurality of anode channels decrease in width along at least a portion of their length in said fuel flow direction, and
said oxidant flow direction, said fuel flow direction and said coolant flow direction are substantially aligned.

6. The fuel cell plate assembly of claim 5 wherein said plurality of cathode channels occupy a first trapezoidal region on said first major surface, said plurality of anode channels occupy a second trapezoidal region on said third major surface, and said plurality of coolant channels occupy a third trapezoidal region between said cathode flow field plate and said anode flow field plate, and said first trapezoidal region, said second trapezoidal region and said third trapezoidal region are substantially co-extensive with said first trapezoidal region overlying said third trapezoidal region, and said third trapezoidal region overlying said second trapezoidal region.

7. The fuel cell plate assembly of claim 3 wherein said plurality of cathode channels decrease in width according to an exponential function along at least a portion of their length in said oxidant flow direction.

8. The fuel cell plate assembly of claim 4 wherein said plurality of cathode channels decrease in width according to first exponential function along at least a portion of their length in said oxidant flow direction, said plurality of coolant channels decrease in width according to a second exponential function along at least a portion of their length in said coolant flow direction, and said plurality of anode channels decrease in width according to a third exponential function along at least a portion of their length in said fuel flow direction.

9. The fuel cell plate assembly of claim 4 wherein said plurality of cathode channels decrease linearly in width along at least a portion of their length in said oxidant flow direction, said plurality of coolant channels decrease linearly in width along at least a portion of their length in said coolant flow direction, and said plurality of anode channels decrease linearly in width along at least a portion of their length in said fuel flow direction.

10. The fuel cell plate assembly of claim 4 wherein said plurality of cathode channels decrease continuously in width along their length in said oxidant flow direction, said plurality of coolant channels decrease continuously in width along their length in said coolant flow direction, and said plurality of anode channels decrease continuously in width along their length in said fuel flow direction.

11. The fuel cell plate assembly of claim 4 wherein said plurality of cathode channels, said plurality of coolant channels and said plurality of anode channels have substantially constant depth along their length.

12. The fuel cell plate assembly of claim 1 wherein:
said first reactant flow field plate and said second reactant flow field plate are stacked in a stacking direction,
said plurality of first reactant channels are located in a first plane perpendicular to said stacking direction, said plurality of second reactant channels are located in a second plane perpendicular to said stacking direction, and said plurality of coolant channels are located in a third plane perpendicular to said stacking direction, and
wherein said first plane, said second plane, and said third plane are separated in said stacking direction.

13. The fuel cell plate assembly of claim 1 wherein said first reactant flow field plate comprises said first plurality of secondary channels on said second major surface, and said second reactant flow field plate comprises said second plurality of secondary channels on said fourth major surface.

14. The fuel cell plate assembly of claim 13 wherein said first plurality of secondary channels align with said second plurality of secondary channels to form said plurality of coolant channels.

15. The fuel cell plate assembly of claim 14 wherein said first reactant flow field plate and said second reactant flow field plate are stacked in a stacking direction, and for said first reactant flow field plate there is a first plane perpendicular to said stacking direction that intersects said plurality of first reactant channels and said first plurality of secondary channels, and for said second reactant flow field plate there is a second plane perpendicular to said stacking direction that intersects said plurality of second reactant channels and said second plurality of secondary channels.

16. The fuel cell plate assembly of claim 13 wherein said first reactant flow field plate is nested with said second reactant flow field plate so that the thickness of said fuel cell plate assembly is less than a combined thickness of said first reactant flow field plate and second reactant flow field plate.

17. The fuel cell plate assembly of claim 13 wherein said first reactant flow field plates and said second reactant flow field plate are stacked in a stacking direction and nested such that there is a plane perpendicular to said stacking direction that intersects said plurality of first reactant channels, said plurality of second reactant channels and said plurality of coolant channels.

18. The fuel cell plate assembly of claim 1 wherein said first reactant flow field plate and said second reactant flow field plate are corrugated plates.

19. The fuel cell plate assembly of claim 1 wherein said first reactant flow field plate comprises said first plurality of secondary channels on said second major surface, and wherein said fourth major surface is substantially flat.

20. A fuel cell plate assembly comprising:
(a) a first reactant flow field plate comprising:
  (i) a first major surface;
  (ii) a second major surface; and
  (iii) a plurality of first reactant channels on said first major surface for directing a first reactant across said first reactant flow field plate in a first reactant flow direction;
wherein said first major surface and said second major surface are oppositely facing major surfaces,
(b) a second reactant flow field plate comprising
  (i) a third major surface;
  (ii) a fourth major surface; and
  (iii) a plurality of second reactant channels on said third major surface for directing a second reactant across said second reactant flow field plate in a second reactant flow direction;
wherein said third major surface and said fourth major surface are oppositely facing major surfaces,
wherein said first reactant flow field plate further comprises a first plurality of secondary channels on said second major surface and/or said second reactant flow field plate further comprises a second plurality of secondary channels on said fourth major surface,
wherein said second reactant flow field plate and said first reactant flow field plate are stacked so that said second major surface cooperates with said fourth major surface to define a plurality of coolant channels between said first reactant flow field plate and said second reactant flow field plate for directing a coolant in a coolant flow direction,
wherein said plurality of first reactant channels decrease in monotonically cross-sectional area and width along at least a portion of their length in said first reactant flow direction,
wherein said plurality of coolant channels decrease monotonically in cross-sectional area and width along their length in said coolant flow direction, and
wherein said first reactant flow direction and said coolant flow direction are substantially aligned.

* * * * *